US011645752B2

(12) United States Patent
Cohen et al.

(10) Patent No.: US 11,645,752 B2
(45) Date of Patent: *May 9, 2023

(54) IMAGE ANALYSIS SYSTEM AND METHOD OF USING THE IMAGE ANALYSIS SYSTEM

(71) Applicant: Molecular Devices, LLC, San Jose, CA (US)

(72) Inventors: Avrum Cohen, San Jose, CA (US); Dihui Hong, San Jose, CA (US); Stephen Rhein, San Jose, CA (US)

(73) Assignee: MOLECULAR DEVICES, LLC, San Jose, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 17/365,710

(22) Filed: Jul. 1, 2021

(65) Prior Publication Data
US 2021/0326565 A1 Oct. 21, 2021

Related U.S. Application Data

(63) Continuation of application No. 16/254,823, filed on Jan. 23, 2019, now Pat. No. 11,068,694.

(51) Int. Cl.
G06V 20/69 (2022.01)
G06K 9/62 (2022.01)
G06T 7/00 (2017.01)

(52) U.S. Cl.
CPC ......... *G06V 20/695* (2022.01); *G06K 9/6254* (2013.01); *G06K 9/6256* (2013.01);
(Continued)

(58) Field of Classification Search
CPC .. G06K 9/6254; G06K 9/6256; G06T 7/0014; G06T 2207/1056; G06T 2207/30024
See application file for complete search history.

(56) References Cited

U.S. PATENT DOCUMENTS 11,068,694 B2 * 7/2021 Cohen ............... G06V 10/7788
2013/0058524 A1 3/2013 Cohen et al.
(Continued)

FOREIGN PATENT DOCUMENTS

JP 2017529583 10/2017
KR 1020160134019 11/2016

OTHER PUBLICATIONS

Extended European Search Report dated Oct. 21, 2022, in connection with Application No. EP20744979, Applicant, Molecular Devices, LLC (8 pages).
(Continued)

*Primary Examiner* — Myron Wyche
(74) *Attorney, Agent, or Firm* — McCracken & Gillen LLC

(57) ABSTRACT

A system and method for analyzing images using programmable device is disclosed. A sequencer operating on the non-transitory programmable device applies the first image analysis step to the first image to develop annotated training data. Specifications of the first image and the first image analysis step are developed using a graphical user interface operating on a computer. In addition, a machine learning system trainer operating on the programmable device trains an untrained machine learning system to develop a trained machine learning system. When the trained machine learning system is presented with the first image as an input, the trained machine learning system develops a prediction of the annotated training data. In addition, the sequencer analyzes a second image by undertaking a workflow, wherein the workflow is received from the computer and is specified using the graphical user interface and comprises a second image analysis step that that specifies operating the trained machine learning system.

20 Claims, 12 Drawing Sheets

(52) U.S. Cl.
CPC ........ *G06T 7/0014* (2013.01); *G06T 2200/24* (2013.01); *G06T 2207/10056* (2013.01); *G06T 2207/20081* (2013.01); *G06T 2207/30024* (2013.01)

(56) References Cited

U.S. PATENT DOCUMENTS

2017/0228865 A1  8/2017  Cohen et al.
2018/0211380 A1  7/2018  Tandon et al.

OTHER PUBLICATIONS

Yousef Al-Kofahi, et al., "A deep learning-based algorithm for 2-D cell segmentation in microscopy images", BMC Bioinformatics, Biomed Central Ltd, London, UK, vol. 19, No. 1, Oct. 3, 2018, pp. 1-11, XP021261218; DOI: 10.1186/S12859-018-2375-z (11 pages).
Martin Weigert, et al., "Content-Aware Image Restoration: Pushing the Limits of Fluorescence Microscopy", bioRxiv, Jan. 23, 2018, XP055451316, DOI: 10.1101/236463; Retrieved from the Internet: URL: https://www.biorxiv.org/content/early/ 2017/12/19/236463.full.pdf (16 pages).
International Preliminary Report on Patentability dated Jul. 27, 2021, in connection with International Application No. PCT/US2020/014696, Applicant, Molecular Devices, LLC (5 pages).
International Search Report dated May 18, 2020 in connection with International Application No. PCT/S2020/014696, Applicant, Molecular Devices, LLC (3 pages).
Written Opinion of the International Searching Authority dated May 18, 2020, in connection with International Application No. PCT/US2020/014696, Applicant, Molecular Devices (4 pages).

\* cited by examiner

IMAGE ANALYSIS SYSTEM AND METHOD OF USING THE IMAGE ANALYSIS SYSTEM

CROSS-REFERENCE TO RELATED APPLICATION

The present application is a continuation of Cohen et al., U.S. patent application Ser. No. 16/254,823, filed Jan. 23, 2019, and titled "IMAGE ANALYSIS SYSTEM AND METHOD OF USING THE IMAGE ANALYSIS SYSTEM." The entire contents of this application are incorporated herein by reference.

FIELD OF DISCLOSURE

The present subject matter relates to image analysis systems for analyzing images of biological samples, and more particularly, to incorporating a machine learning system in such an image analysis system.

BACKGROUND

An imaging system may be used to obtain a microscopy image of a biological sample. Such image may be processed using an image analysis system to identify pixels of the image that are associated with objects of interest (cells, organelles, and the like) therein, to classify the different types of objects of interest represented in the image, to obtain metrics regarding such objects of interest or portions thereof and the like. Such metrics may include, for example, a count of the objects of interest, a count of each type of object of interest represented in the biological sample, sizes (area, perimeter, volume) of the cells, statistics (mean, mode, median, standard deviation, etc.) of the sizes of the objects of interest, and the like.

Some image analysis systems allow an operator to interactively specify a workflow for analyzing one or more image(s) of a biological sample to create an output image. Each pixel of the output image is associated with corresponding pixel(s) of the image(s) of the biological sample, and a value of the pixel of the output image indicates whether the corresponding pixel(s) of the image(s) biological sample is/are associated with an object of interest such as a cell, a particular type of component of a cell, a particular type of cell, or a cell having certain characteristics, and the like.

The workflow specified using the image analysis system includes a sequence of image analysis steps to apply to the image(s) of the biological sample or image(s) that are generated from prior image analysis steps, and parameters for such image analysis steps. Typically, the sequence of image analysis steps that comprise the workflow and the parameters therefor are defined using one or more images of an exemplary biological sample. For example, the operator selects one or more image(s) either acquired from the imaging system or that resulted from undertaking a previous image analysis step. The operator also selects an image analysis step from a library of available image analysis steps to undertake using the selected image(s) and iteratively adjusts the parameters associated with the selected image analysis step while seeing the effect of such adjustments on the output of the image analysis step. Thereafter, if such adjustment of the parameters results in an output that meets the expectations of the operator, the operator adds the selected image analysis step and the parameters associated therewith to the workflow. Otherwise, the operator may select a different image analysis step or terminate creating the workflow. The operator continues developing the workflow in this manner until the output of the workflow is satisfactory. After the operator has selected all of the image analysis steps and the sequence in which such steps are to be undertaken, the image analysis system may apply the workflow on one or more additional image(s) to analyze such image(s).

Some image analysis steps that comprise the workflow are associated with acquisition of one or more image(s) of a biological sample under particular conditions, such as, for example, using particular illumination conditions, during fluorescence, using one or more filters between the illuminant and the biological sample, using one or more filter(s) between the biological sample and an image capture device, using particular objective lenses, and the like. Some image analysis steps may include using image processing operations to process acquired image(s) and/or image(s) generated as a result undertaking another image analysis step. Such image processing operation may include applying one or image processing filter(s) to one or more image(s) such as an unsharp masking filter, threshold filter, an edge detection filter, smoothing filters, and the like. The image processing operation specified in the workflow may also include generating an image by combining one or more captured image(s) with one another, combining one or more captured image(s) with one or more images generated by a prior image processing operation, and the like. The image processing operations may further include measurement operations that count different types of objects (e.g., cells or portions thereof) in an image and measuring metrics associated with such objects as described above.

Cohen et al., U.S. Pat. No. 8,577,079, entitled "IMAGE PROCESSING SYSTEM PROVIDING SELECTIVE ARRANGEMENT AND CONFIGURATION FOR AN IMAGE ANALYSIS SEQUENCE," discloses on such image analysis system. In addition, Cohen et al., U.S. Pat. No. 9,928,403, entitled "SYSTEM AND METHOD FOR IMAGE ANALYSIS OF MULTI-DIMENSIONAL DATA," discloses another such image analysis system for specifying and applying workflows that may be used for multi-dimensional images. The entire contents of both of these patents are incorporated herein by reference.

It would be useful to incorporate a trained machine learning system that has been trained to analyze one more images into a workflow. However, such a trained machine learning system would have to analyze images of particular types of biological samples for particular characteristics, such as, for example, pixels associated with cells or organelles thereof, types of cells, and the like, represented therein. A machine learning system trained to analyze one type of biological sample may not be useful to analyze another type of biological sample. Further, training of machine learning systems has typically required expertise in artificial intelligence and/or machine learning and, as such, it has not been feasible to develop a variety of trained machine learning systems, each of which is trained to analyze a particular type of biological sample. It would be useful if the image analysis system included a feature that enabled an operator to readily train a machine learning system to analyze a particular type of biological sample for particular characteristics and incorporate such trained machine learning system in a workflow developed using the image analysis system.

SUMMARY

According to one aspect, a system for analyzing images includes a programmable device and a sequencer operating on the programmable device that applies a first image analysis step to a first image to develop annotated training data, wherein specifications of the first image analysis step and the first image are developed using a graphical user interface operating on a computer. The system also includes a machine learning system trainer operating on the programmable device that trains an untrained machine learning system to develop a trained machine learning system. When the trained machine learning system is presented with the first image as an input, the trained machine learning system develops a prediction of the annotated training data. Further, the sequencer analyzes a second image by undertaking a workflow, wherein the workflow is received from the computer and is specified using the graphical user interface and comprises a second image analysis step that that specifies operating the trained machine learning system.

According to another aspect, a method for analyzing images comprises the step of operating a programmable device to undertake the steps of developing annotated training data by applying a first image analysis step to a first image, wherein specifications of the first image and the first image analysis step are developed using a graphical user interface operating on a computer. The programmable device is also operated to train an untrained machine learning system to develop a trained machine learning system and to undertake a workflow on a second image to analyze the second image. When the trained machine learning system is presented with the first image as an input, the trained machine learning system develops a prediction of the annotated training data. Further, a specification of the workflow is developed using the graphical user interface operating and comprises a second image analysis step, wherein the second analysis step includes operating the trained machine learning system.

Other aspects and advantages will become apparent upon consideration of the following detailed description and the attached drawings wherein like numerals designate like structures throughout the specification.

DETAILED DESCRIPTION

Figure 1:
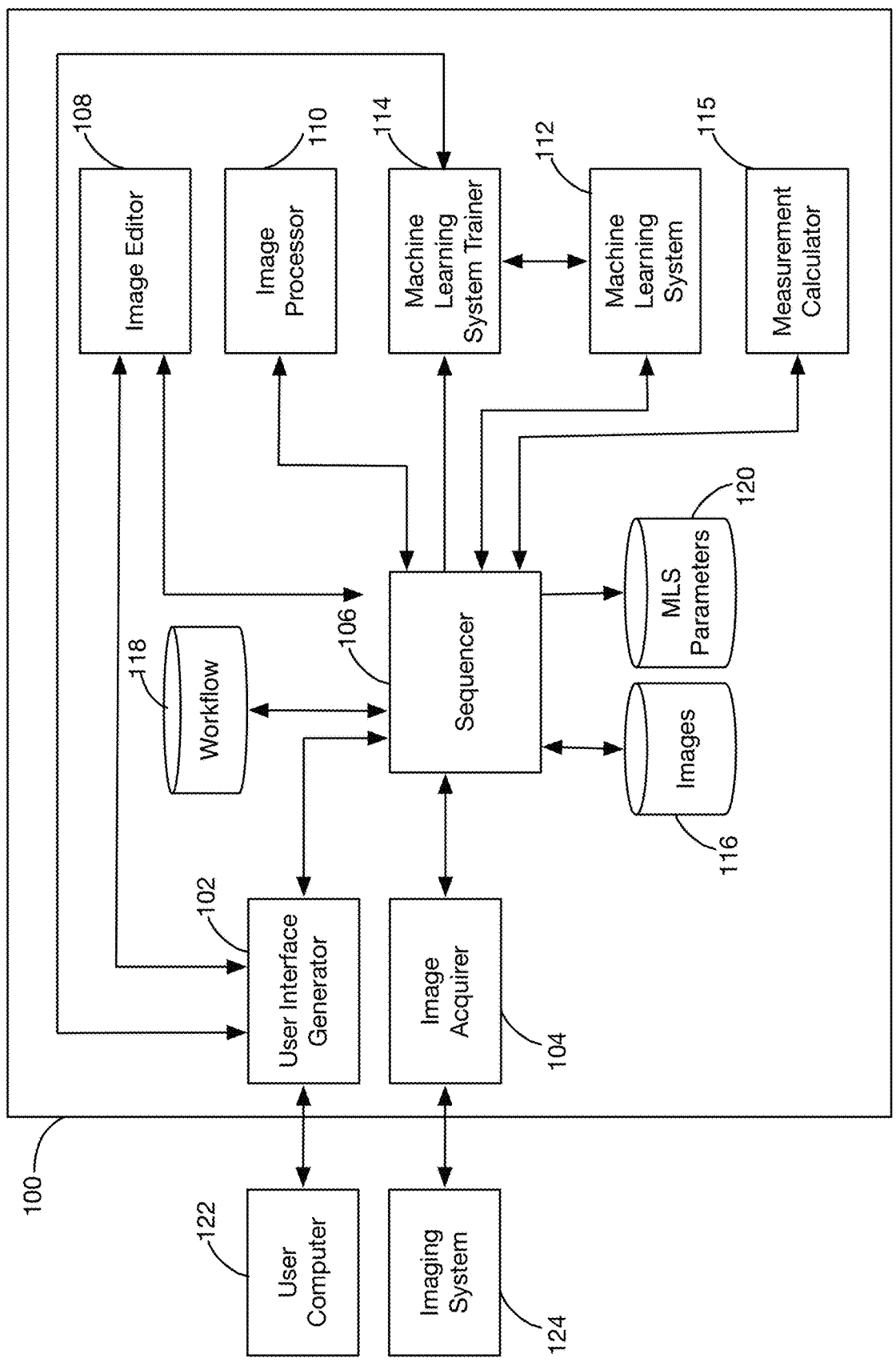
FIG. 1 is a block diagram of an image analysis system.

For sake of clarity, in the present disclosure, image analysis steps, including training and use of a machine learning system, are described as operating on one image and producing another image. However, it should be apparent to one of ordinary skill in the art, that some image analysis steps operate on multiple input images and generate one output image, other image analysis steps operate on one input to generate multiple output images, and still other image analysis steps operate on a plurality of input images and generate a plurality of output images. Further, in some embodiments, measurements may be developed from an input image or an image that result from an application of one or more image analysis steps, and such measurements may be provided as an input to a further image analysis step.

As described in detail below, an operator (i.e., a user of the image analysis system) may interactively use an image analysis system to train a machine learning system to analyze an image of a biological sample and then specify the use of the trained machine learning system in a workflow in combination with one or more image analysis step(s) to analyze additional images of other biological samples, for example, images of biological samples acquired by an imaging system.

The operator may also use the image analysis system to train a machine learning system and then incorporate operation of the trained machine learning system as one of the image analysis steps in the workflow. In particular, as described in greater detail below, the operator selects an example input image, applies one or more image analysis steps on the input image to develop annotated training data, and trains the machine learning system to produce a prediction of the annotated training data when presented with the example input image as an input. Typically, the annotated data is either a segmentation image, a classification image, or an image derived from one or both of the segmentation and classification image(s). Such annotated data includes an output value that corresponds to each pixel of the input image.

If the annotated data is a segmentation image, the output value indicates whether the corresponding pixel of the input image is associated with an object of interest such as a cell, a feature of the cell, a particular type of cell, and the like. The values of the annotation data that correspond to pixels of the input image that are associated with the object interest are set to a predetermined value associated with a foreground pixel and the values of the annotation data that correspond to pixels of the input image not associated with the object of interest are set to a predetermined value associated with a background pixel.

If the annotated data is a classification image, the output value associated with a pixel of the input image indicates a class to which a portion of the biological sample represented in the pixel belongs. Such class may be, for example, a cell type, an organelle type, a cell condition, and the like. The cell condition may include, for example, whether the cell is alive or dead, whether the cell is undergoing cellular division, or a particular state of such cellular division. Each class may be associated with a particular pixel value. The values of the annotation data that correspond to pixels in the input image associated with a particular class are set to the particular value. The values of the annotation data that correspond to pixels in the input image that are not associated with any such class are set to a predetermined value associated with a background pixel.

As noted above, the annotated data may be derived from the segmentation and/or classification image. For example, in one embodiment, the segmentation image may be processed to identify the coordinate(s) of centroid(s) of one or more group(s) of contiguous of pixels having a value associated with a foreground pixel (i.e., the centroid of each blob in the segmentation image, a biological cell, an organelle, etc.). The value(s) of the annotated data associated with such coordinate(s) is/are set to a first predetermined value and value(s) of the annotated data not associated with such coordinate(s) is/are set to a second predetermined value. In some embodiments, the first predetermined value is identical to the value associated with foreground pixels in the segmentation image and the second predetermined value is identical to the value associated with background pixels.

In some embodiments, the segmentation image may be processed to develop annotated data that include coordinates of, for example, one or more center(s), one or more bounding box(es), an area, and the like of one or more object(s) of interest in the training image. In some embodiments, such annotated data may include, for example, an object score or confidence level associated with each object represented in the segmentation image. Such object score may indicate, for example, a confidence level that the object associated therewith matches a particular criterion such as, for example, a particular shape, a particular intensity of a pixel in the source image associated with a particular class of objects, and the like. In some embodiments, the annotated data training data may be a table with one entry per object identified in the segmentation image. Each such entry may include, for example, an object identifier and one or more characteristics or numerical values (e.g., coordinates described above, object scores, and the like) associated with the object associated with the entry. Developing annotated data that is a table instead of an image may be advantageous, for example, because the table may require less memory than the image or may be more easily analyzed.

In some embodiments, the annotated training data may be viewed as an image and the values of the pixels of such image indicate whether corresponding pixels of the input image are associated with the object of interest.

After the machine learning system has been trained as described above, an image of an additional biological sample may be presented as an input to the machine learning system and in response the trained machine learning system generates output values. In some embodiments, each output value corresponds to one pixel of the image of the additional biological sample and indicates whether the pixel of the image is associated with the object of interest.

Further, first and second types of images of a biological sample may be acquired, for example, a fluorescent image and a transmitted light image, respectively. Thereafter, the annotated training data may be developed from the first type of image, and the machine learning system may be trained to accept as an input the second type of image of the biological sample and in response generate the annotated training data. The machine learning system trained in this manner may then be used to analyze a further biological sample using only the second type of image of the further biological sample. One of skill ordinary in the art would understand that the machine learning system trained in this manner would be beneficial, for example, if only the second type of image of the biological sample is available, acquiring the first type of image is harmful or otherwise detrimental to the biological sample, or acquiring the first type of image requires more complexity or cost than the second type of image.

Referring to FIG. 1, an image analysis system 100 includes a user interface generator 102, an image acquirer 104, a sequencer 106, an image editor 108, an image processor 110, a machine learning system 112, and a machine learning system trainer 114, and a measurement calculator 115. The image analysis system 100 also includes an images data store 116, a workflow data store 118, and a machine learning system parameters data store 120.

The user interface generator 102 is coupled to a user computer 122 and the image acquirer 104 is coupled to an imaging system 124. In some embodiments, the imaging system 124 may be, for example, a high-content imaging system, a lens-free or lens based electronic microscope, a manually operable microscope, and the like.

As described in greater detail below, to develop a workflow, the user interface generator 102 instructs the user computer 122 to generate a graphical user interface (GUI) on a display thereof that allows a user to specify an image analysis step and, if necessary, parameters associated therewith and to view results of such image analysis steps. One who has ordinary skill in the art would understand that when the user interface generator 102 is described herein as receiving information from the user computer 122 or an operator of such computer, the user interface generator 102 generates and transmits instructions to the user computer 122 that cause the GUI to acquire information from the user and transmit such information to the user interface generator 102. Similarly, when the user interface generator 102 is described as displaying information on the user computer 122, the user interface generator 102 generates and transmits instructions to the user computer 122 that cause GUI to display such information.

Figure 2:
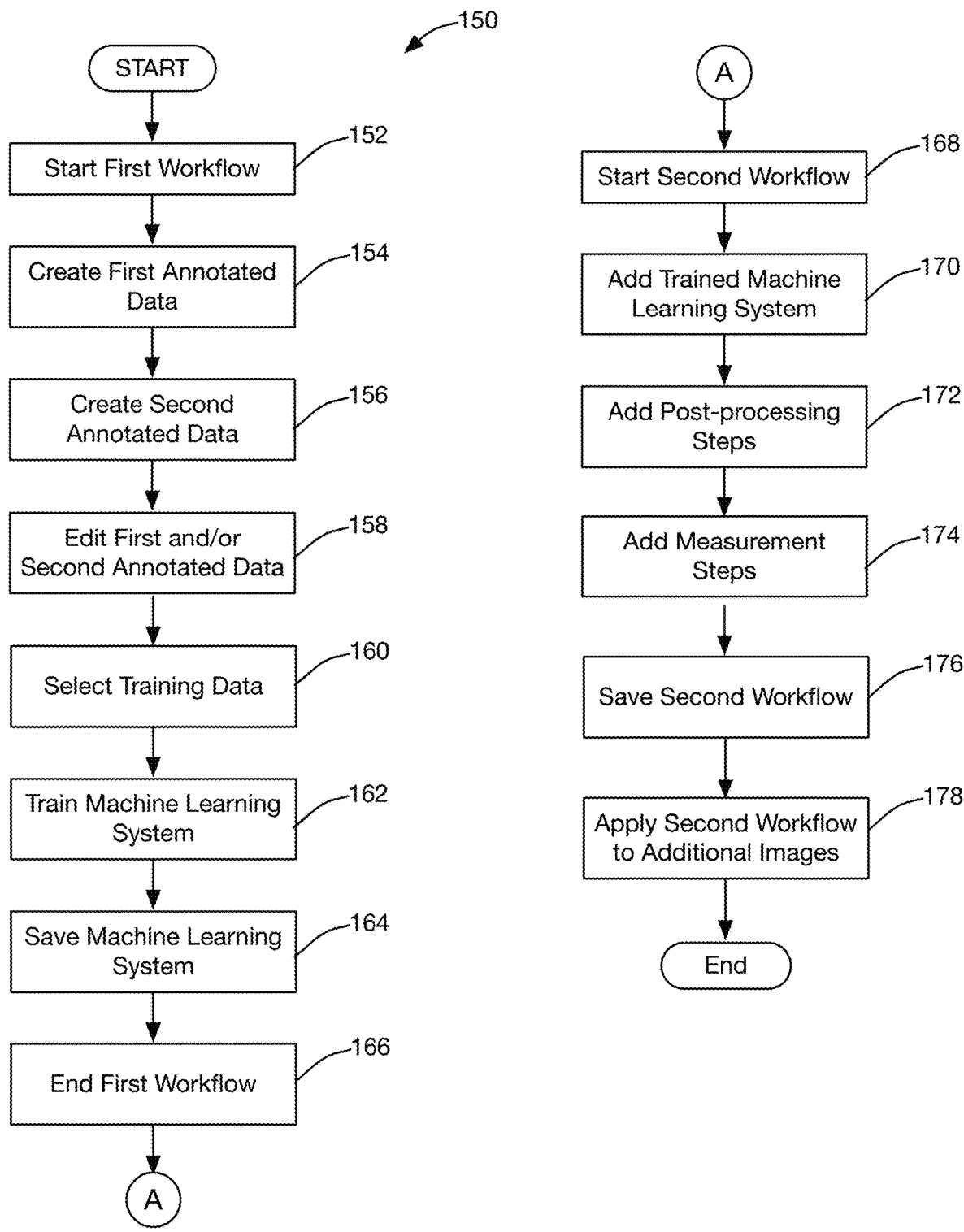
FIG. 2 shows a flowchart of how an operator may use the image analysis system of FIG. 1 to create and use an image analysis workflow that includes a machine learning system.

FIG. 2 shows a flowchart 150 of an exemplary use of the features of image analysis system 100 to create and use trained the machine learning system 112 in a workflow. Referring to FIG. 2, as described in greater detail below, the operator directs the sequencer 106 via a GUI generated by the user interface generator to begin a new workflow, at step 152.

At step 154, the operator specifies one or more image analysis operation(s) such image processing operation(s) that the image processor 110 undertakes to develop first annotated data from one or more image(s) of a biological sample. The biological sample may be a labeled (i.e., stained) or unlabeled biological sample and the image(s) may be captured using various wavelengths of light, using transmitted light, when the biological sample is undergoing fluorescent, and the like. Image processing operations described above may be applied to one or more of these images and the results of applying such steps may be combined to create the first annotated data. In some embodiments, the first annotated data represents a binary segmented image in which each pixel that has either a first predetermined value that is associated with an object of interest (i.e., is a foreground pixel) in the biological sample or a second predetermined value that is not associated with an object of interest (i.e., is a background pixel).

At step 156, optionally, the operator specifies one or more image analysis operation(s) such as image processing operation(s) undertaken by the image processor 110 to develop second annotated data one or more images of the biological sample or an intermediate image developed from one or more images of the biological sample including, for example, the first annotated image. The one or more images of the biological sample may include those images used to create the first annotated data and/or additional images of the biological sample. In some embodiments, the pixels of the second annotated data are associated with a classification that is determined using, for example, numerical filtering and/or in accordance with a number of adjacent pixels of the first annotated data having similar or identical values, the dimensions of a bounding box of such adjacent pixels, the circularity or other shape metric of such adjacent pixels, and the like. A predetermined unique value (e.g., a color) may be associated with each classification and values of the pixels of the second annotation set are assigned according to the classification thereof.

At step 158, the operator may use the image editor 108 to edit the first annotated data to, for example, change foreground pixels into background pixels or background pixels into foreground pixels. The operator may also use the image editor 108 to edit the second annotated data to adjust the classification values associated with certain pixels, change foreground pixels to background pixels, and/or change background pixels to foreground pixels.

At step 160, the operator identifies an image of the biological sample to use as a training image.

At step 162, the operator uses the machine learning system trainer 114 to train an untrained machine learning system 112 using the training image, the first annotated data, and the second annotated data (if any). The machine learning system 112 is trained so that when the machine learning system 112 is presented with the training image as an input, the machine learning system generates as an output a first prediction data of the first annotated data as an output. If both the first annotated data and the second annotated data are used to train the machine learning system 112, the machine learning system, when presented with the training data as an input, generates first and second prediction data of the first annotated data and the second annotated data, respectively. Each datum of such prediction data provides an indication or probability that a corresponding datum of the annotated data has a particular value.

At step 164, the operator uses the machine learning system trainer 114 to store the parameters associated with the trained machine learning system 112 in the machine learning system parameters data store 120 and associates an identifier with such parameters. Thereafter, the identifier may be used to incorporate the trained machine learning system 112 associated with such identifier in additional workflows.

At step 166, the operator ends or closes the first workflow.

In some embodiments, the first workflow is associated with an identifier and saved in the workflow data store 118. The first workflow may then be recalled at a later time, if necessary, to update (e.g., extend or refine) training of the machine learning system 112 or to train another instance of an untrained machine learning system 112.

In some embodiments, the training image selected by the operator at step 160 may include a sufficient quantity of objects (e.g., cells, organelles, and the like) to provide enough data to train the machine learning system 112. However, it should be apparent to one who has ordinary skill in the art, that the operator may select a plurality of training images at step 160; develop first, and optionally, second annotated data sets that correspond each of the plurality training images at steps 154-158; and use such plurality of images and first, and optional, second annotated data sets to train the machine learning system 112 at step 162.

To use the trained machine learning system developed at step 162, the operator uses the sequencer 106 to create a second workflow, at step 168.

At step 170, the operator uses the sequencer 106 to add operation of the trained machine learning system 112 as an image processing operation by selecting the identifier associated with the trained machine learning system from a menu of image processing operations provided by the image analysis system 100.

At step 172, the operator uses the sequencer 106 to add any additional post-processing image analysis steps to the workflow. Such post-processing image analysis steps may cleanse the output generated by the trained machine learning system and may include, for example, automatic boundary filling, edge detections, removal of spurious values, removal of adjacent that all have a value associated with the foreground but are too large or too small to be associated with an object of interest, removal of spurious content, and the like.

At step 174, the operator uses the sequencer 106 to add any desired measurement steps to automatically develop one or more metric(s) from the characteristic image such as, for example, a count of the number of cells or portions thereof represented in an image analyzed by the second workflow that have at least a predetermined probability of being associated with the characteristic. Automatically developing such metric(s) may involve applying boundary or edge detection, boundary filling, and similar algorithms to the output generated by the trained machine learning system 112.

At step 176, the operator uses the sequencer 106 to associate a name with the second workflow and save the second workflow in the work flow data store 118.

If the first and/or second annotated data set developed at step 154 and/or 156 is a table of entries or numerical data (e.g., coordinates of objects, bounding boxes, and the like), the machine learning system 112 produces a table or numerical data, respectively, in response to an image presented as an input.

Further, it should be apparent to one who has ordinary skill in the art that selecting training data that is a first image of a first biological sample acquired using a first imaging condition and annotated training data that is second image of the first biological sample acquired using a second imaging condition, the machine learning system 112 may be trained to produce from a third image of a second biological sample acquired using the first imaging condition a fourth image, wherein the fourth image is an estimate of an image of the second biological sample that would be acquired using a second imaging condition. Such first and second imaging condition may include, for example, acquisition of a transmitted light image using different illuminants, filters, and/or lenses; acquisition of a fluorescent light image using different illuminants, filters, and/or lenses; acquisition of transmitted light or fluorescent light images at different focal distances; and the like. For example, the machine learning system 112 may be trained to produce an estimate of a fluorescent light image when presented with a transmitted light image as input, an estimate of a transmitted light image when presented with a fluorescent light image, an estimate of a first fluorescent light image acquired using a first illuminant when presented with a second fluorescent light image acquired using a second illuminant, and the like.

After the second workflow has been created and saved, at step 178, the second workflow may be applied to one or more additional images to automatically undertake the steps specified by such workflow. For example, in some embodiments, the operator may use the graphical user interface to select one or more images stored in the images data store 116 and apply the second workflow on such images. In other embodiments, the operator may use the graphical user interface to direct image analysis system 100 to automatically capture one or more images of biological samples loaded in the imaging system 124 and apply the second workflow on such captured images. The data that results from the application of the second workflow may be displayed to the user, stored in a data store associated with image analysis system 100, or transmitted to a further system (not shown) for additional analysis.

Figure 3:
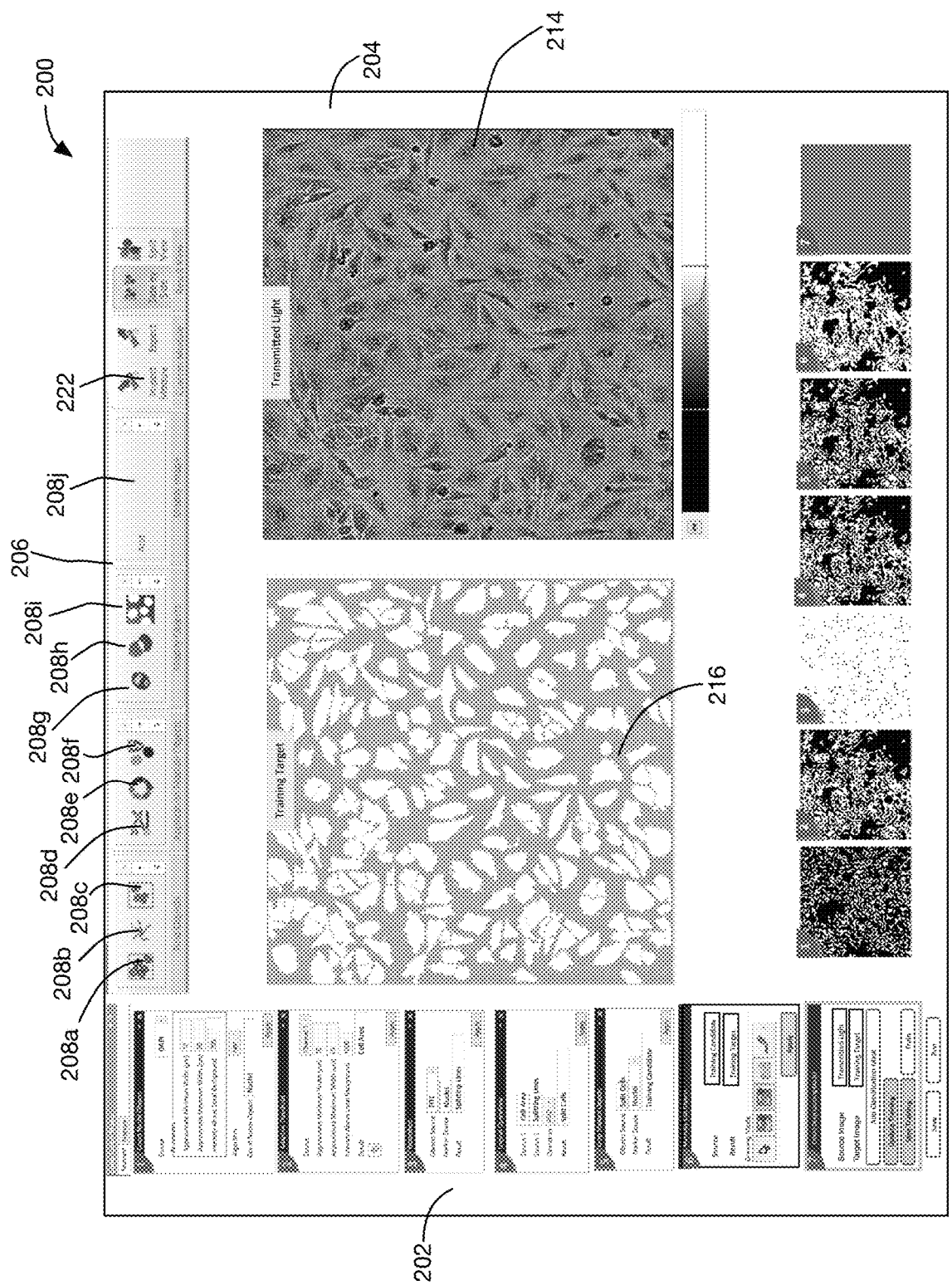
FIG. 3 is a graphical user interface of the image analysis system of FIG. 1.
Figure 3A:
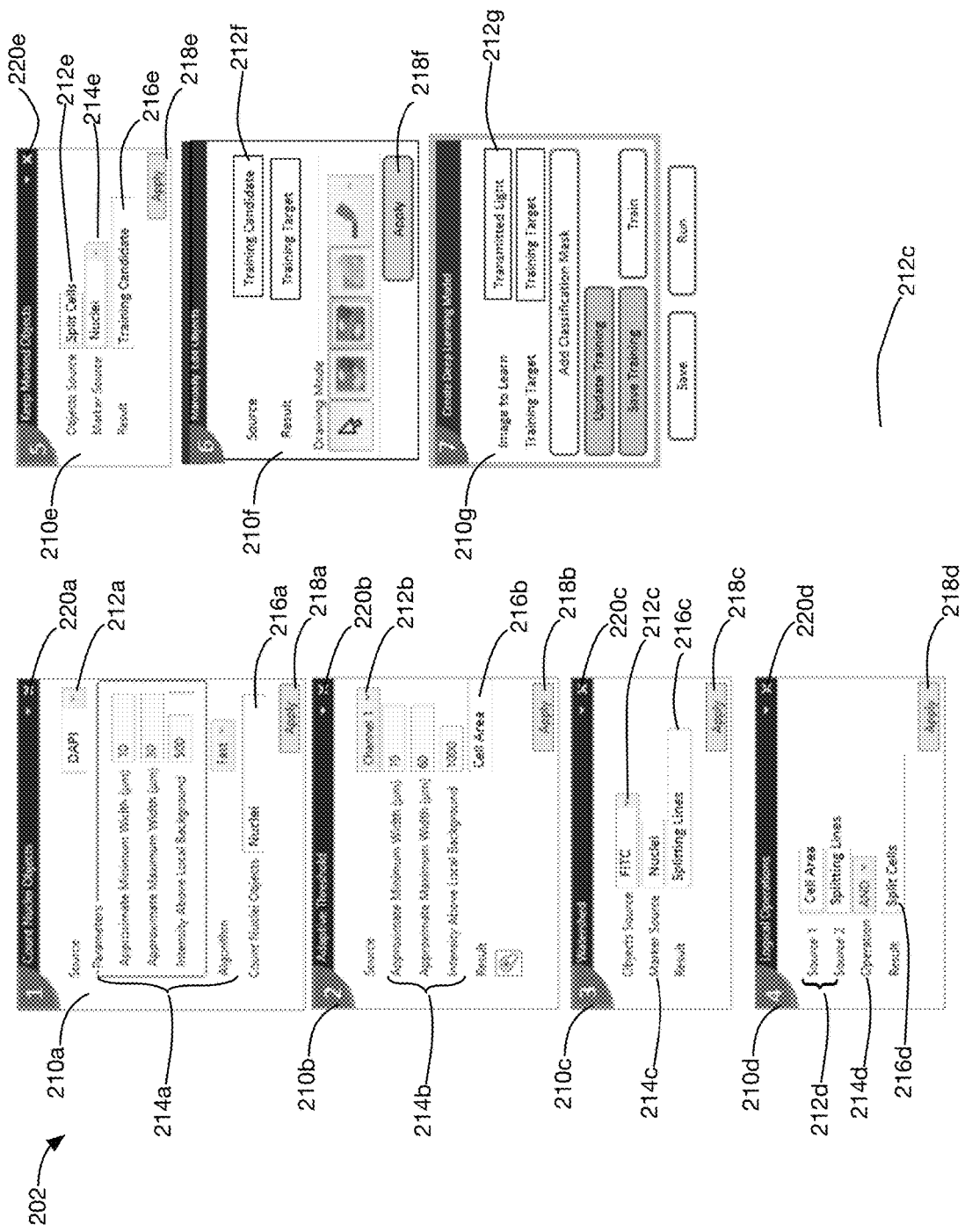
FIG. 3A is a panel of the graphical user interface shown in FIG. 3.

FIGS. 3 and 3A show an embodiment of a GUI 200 generated by the user interface generator 102 on the user computer 122. Referring to FIGS. 3 and 3A, the GUI 200 includes a region 202 in which panels for specifying image analysis steps may be displayed and a region 204 in which one or more images may be displayed. In some embodiments, the region 204 includes one or more sub-regions 205a, 205b, etc. so that multiple image may be displayed simultaneously. The GUI 200 also includes a region 206 that includes one or more selectable icons 208, each such icon 208a, 208b, . . . 208j is associated with an available image analysis step. In some embodiments, one or more icon(s) 208 may be associated with a drop-down menu (not shown) that allows selection of a particular image analysis step. It should be apparent to one who has ordinary skill in the art that the GUI 200 may incorporate ways of selecting an image analysis step.

Referring to FIG. 3A, selecting an icon 208 displays a corresponding panel 210a, 210b, 210c, etc. in the region 202. Each panel is associated with a particular image analysis step. Each panel 210 includes one or more pop-up menu(s) 212 that may be used to select the source(s) of any input data used by the image analysis step associated with the panel 210. Each pop-up menu 212 presents identifiers associated with predefined configurations of the imaging system 124 (FIG. 1) to use to capture an image of a biological sample loaded in the imaging system 124 or output data generated by a previously defined image analysis step.

The predefined imaging configurations of the imaging system 124 include acquisition of a transmitted light image of the biological sample, acquisition of the biological sample under fluorescence, and the use of particular combinations of an illumination condition (e.g., wavelength of light), one or more lens(es), one or more filter(s) disposed in the light path between the illumination source and the biological sample, one or more filter(s) disposed in the light path between the biological sample and an image capture device, and the like.

In some embodiments, the imaging system 100 is configured to associate particular identifiers, such as DAPI, with corresponding data sources. In the example shown in FIG. 3A, the data sources DAPI and FITC are associated with images of a biological sample acquired using illumination that shows DAPI and FITC staining, respectively, apparent to those who have ordinary skill in the art. Similarly, the identifier "Transmitted Light" is associated with a data source associated with an image of the biological sample captured using transmitted light illumination.

Each panel 210 may also include one or more input area(s) 214 in which parameters used by the image analysis step associated with the panel may be entered, and an input area 216 in which an identifier associated with the output of the image analysis step may be entered. The identifier entered in the input area 216 of a particular panel 210 is a name or a label by which the output generated by the image analysis step associated with the particular panel 210 may be referred to for use in a subsequent image analysis step. For example, the operator may specify use of the output of the particular panel 210 as an input or a parameter of a panel 210 associated with such subsequent image analysis step by selecting the identifier associated with such output in the pop-up menu 212 or entering such identifier in the input area 214.

Some panels 210 include an "Apply" button 218 that when selected undertakes the image analysis step associated with such panel and generates a result (such as an image) that is associated with the identifier 216 specified in the panel 210. Some panels 210 include a region 220 that, when selected, closes the panel 210 (i.e., removes the panel from the region 202) and removes the image analysis step associated with such panel from the workflow.

For example, the panel 210a is associated with an image processing operation named "Count Nuclei Objects" and allows specification of one data source using the pop-up menu 212a. In the example shown in FIG. 3A, a data source called "DAPI" has been selected using the pop-up menu 212a. Parameters are entered in the input area 214a that specify that the image analysis step associated with the panel 210a should identify those contiguous pixels in the input image (i.e., from the source DAPI) that span between 10 and 30 pixels, have a pixel value that is at least 500 intensity levels above neighboring pixels, and that a "FAST" algorithm should be used for such processing. The result (e.g., a binary image) will be associated with the identifier "Nuclei" (specified in the input area 216a) in which the values of the result associated with pixels of the input image that meet the parameters specified in the input area 214a are set to a value associated with foreground pixels. Further, the values of the result associated with pixels of the input image that do not meet such parameters are set to a value associated with background pixels. The image analysis step specified by the panel 210a may be undertaken interactively if the user selects the "Apply" button 218a and/or as part of a workflow comprising such image processing step.

Continuing with the example shown in FIGS. 3 and 3A, the panels 210a through 210e apply image analysis steps to DAPI and FITC images to generate a result associated with an identifier "Training Candidate." Such image analysis steps include applying the "Count Nuclei Objects" image analysis described above in connection with the panel 210a, an adaptive threshold image analysis step (panel 210b), a watershed image analysis step (210c), a logical AND operation (210d), and an image analysis step to select pixels in accordance with the results of the "Count Nuclie Objects" and logical AND image analysis steps (210e), as would be understood by one of skill in the art.

The panel 210f specifies allows the user to manually edit the image associated with the identifier "Training Candidate," as described in greater detail below, to generate a result image associated with an identifier "Training Target." The panel 210g specifies an image analysis step that uses such result image with a transmitted light image to train a machine learning system, as described in greater detail below.

Referring once again to FIG. 1, to develop a workflow, the user interface generator 102 receives a specification of an image analysis step from the user computer 122, and the sequencer 106 coordinates step of the remaining components of the image analysis system 100 to undertake the specified image analysis step to develop an output of the image analysis step, if any, and directs the user interface generator 102 to display any such output on the user computer 122.

As described in greater detail below, the user interface generator 102 and the sequencer 106 allow the operator to specify image processing operations in in this manner until the operator of the user computer 122 indicates that either the workflow has been specified or the workflow should be discarded. If the operator indicates that the workflow has been specified, the sequencer 106 records the image analysis steps and the parameters associated therewith in the workflow data store. In some embodiments, the operator provides a name to associate with the workflow. In other embodiments, the sequencer 106 may generate a name to associate with the workflow. It should be apparent to one who has ordinary skill in the art that other ways of associating a name with the workflow may be used.

After the workflow has been developed and stored as described above, the operator may load a biological sample to be analyzed in the imaging system 124 and select the name associated with the workflow. In response, the sequencer 106 operates the other components of the image analysis system 100 to undertake the image analysis steps specified by the workflow to generate a result that is displayed by the user interface generator 102 on the user computer 122, recorded in a data store (not shown) associated with the image analysis system 100, or provided to another system (not shown) for further analysis.

Figure 4:
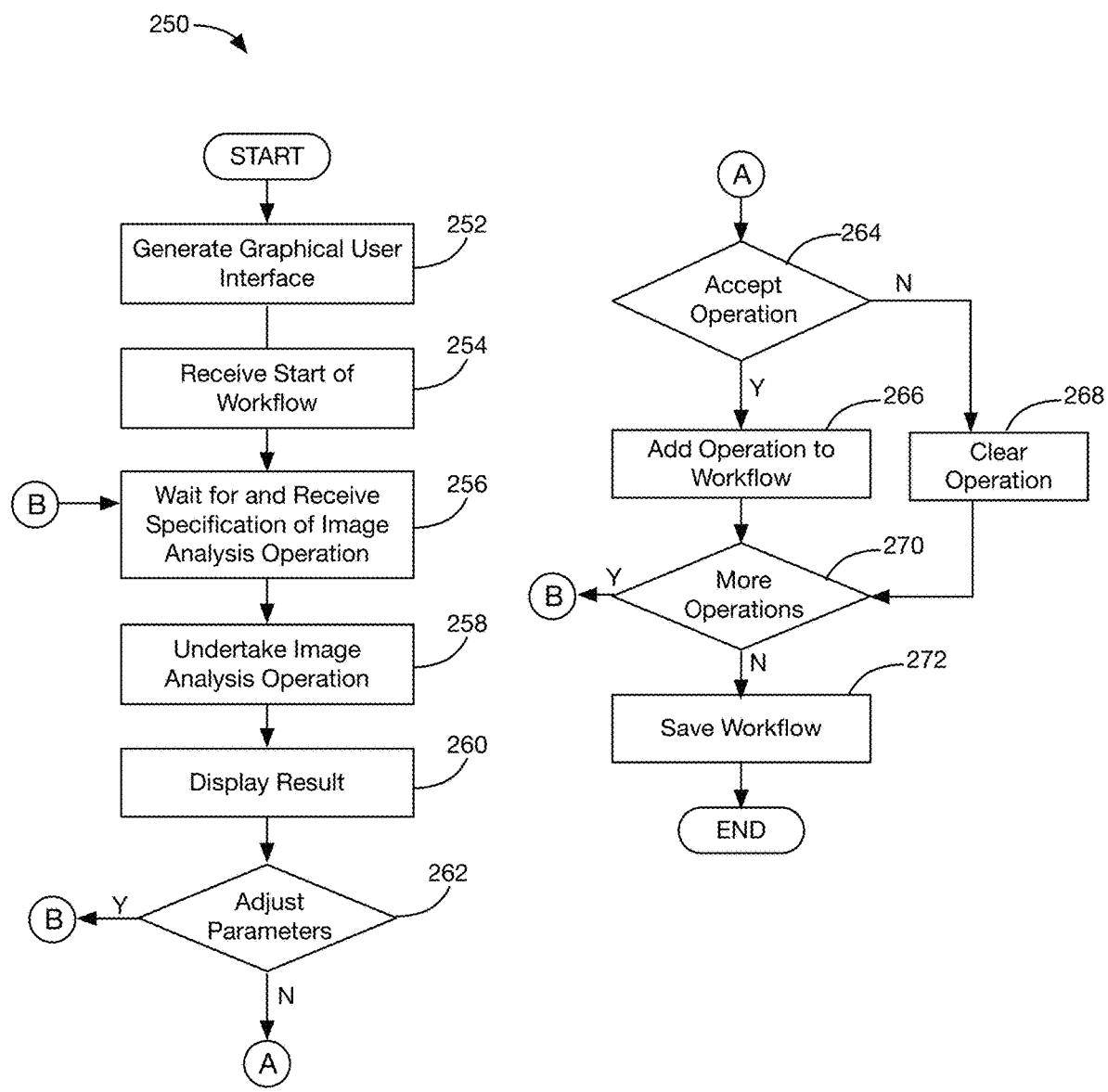
FIG. 4 is a flowchart that shows the operation of image analysis system of FIG. 1 to create a workflow.

FIG. 4 shows a flowchart 250 of the steps undertaken by the image analysis system 100 to create a new workflow. Referring to FIGS. 1-4, at step 252, the user interface generator 102 generates and transmits instructions to the user computer 122 that cause the user computer 122 to display the GUI 200 described above. At step 254, the user interface generator 102 receives from the user computer 122 a directive to begin specification of new workflow. For example, the operator of the user computer 122 may select a button 222 of the GUI 200 (FIG. 3) to provide such directive.

At step 256, the user interface generator 102 receives a specification of an image analysis step as described above including the image analysis step to undertake and any parameters associated with such step.

At step 258, the sequencer 106 undertakes the image analysis steps received at step 256 and, at step 260, directs the user interface generator 102 to display in the region 204 of the GUI 200 any results of undertaking such step.

At step 262, the user interface generator 102 receives from the user computer 122 an indication whether the operator has changed one or more parameter(s) specified at step 256. If the operator has changed one or more parameter (s), the user interface generator 102 proceeds to step 256 to receive such changed specification of the image analysis step.

Otherwise, at step 264, the user interface generator 102 receives an indication whether the image analysis step and any parameter(s) associated therewith received at step 256 are acceptable. If such step and parameter(s) are acceptable, the sequencer 106 stores information regarding the image analysis steps (e.g., an identifier associated with the step) and the parameter(s) in the workflow data store 118, at step 266. Otherwise, at step 268, the sequencer 106 clears any information regarding such image analysis step from a memory thereof and the user interface generator 102 removes the panel 210 associated with the image analysis step from the GUI 200.

Thereafter, at step 270, the user interface generator 102 receives from the user computer 122 an indication from the user computer 122 whether the operator wishes to specify another image analysis step to add to the workflow. If the operator does want to add another image analysis step, the image analysis system 100 proceeds to step 256. Otherwise, the sequencer 106 stores the workflow in the workflow data store 118, at step 272, for use with images of other biological samples.

Figure 5:
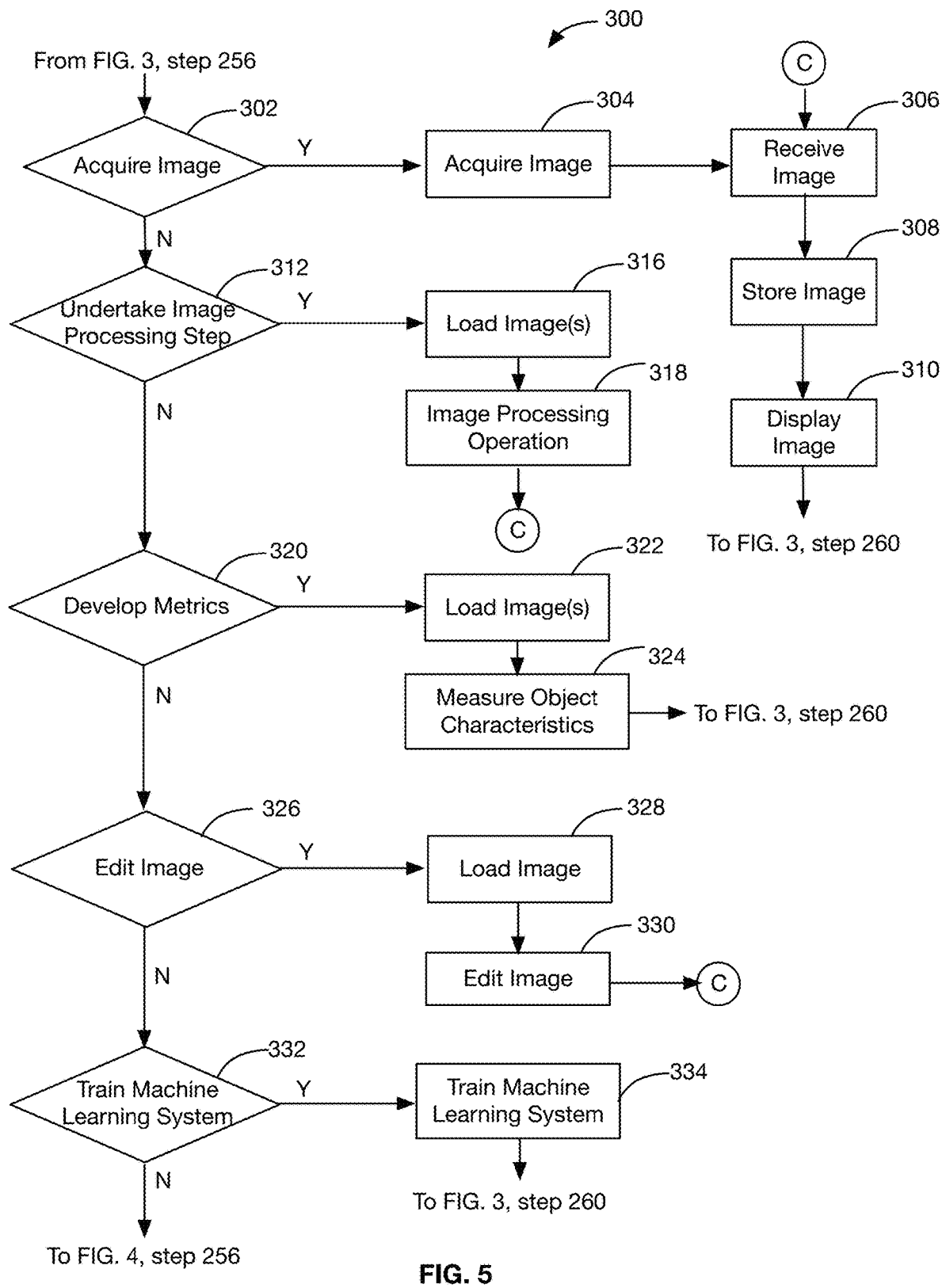
FIG. 5 is another flowchart that shows the operation of the image analysis system of FIG. 1 to create a workflow.

FIG. 5 is a flowchart 300 that shows the steps undertaken by one embodiment of sequencer 106 during step 258 of the flowchart 250 shown in FIG. 4. Referring to FIGS. 1-5, at step 302, the sequencer 106 determines if the image analysis step specified at step 256 (FIG. 4) specifies acquiring an image from the imaging system 124. If so, the sequencer 106, at step 304, directs the image acquirer 104 to instruct the imaging system 124 to acquire an image of a sample loaded in the imaging system 124 in accordance with the parameters associated with the specified image analysis step. The sequencer 106 receives the acquired image at step 306, stores the acquired image in the images data store 116 at step 308, and proceeds to step 260 of FIG. 4 to direct the user interface generator 102 to display the acquired image in the region 204 of the GUI 200.

If, at step 302, the sequencer 106 determines that the image analysis step does not specify acquisition of an image, then, at step 312, the sequencer 106 determines whether such image analysis step specified undertaking an image processing operation, including using an already trained machine learning system 112. If so, at step the sequencer 106 loads the images specified by any parameter(s) associated with the image analysis step at step 316 and invokes the image processor 110 on such images at step 318. Thereafter, the sequencer 106 proceeds to steps 306 and 308 to receive and store, respectively, the results generated by the image processor 110.

If, at step 312, the sequencer 106 determines that the image analysis step does not specify undertaking an image processing operation, the sequencer 106, at step 320 determines if the image analysis step specifies developing metrics of characteristics of one or more object(s) represented in one or more image(s). If so, the sequencer 106, at step 322, loads the one or more image(s) specified as parameters to the image analysis step at step 256 (FIG. 4) and invokes the measurement calculator 115 to develop metrics of such objects at step 324. For example, the measurement calculator 115 develops a count of the number of objects (cells or portions thereof) represented in the loaded image(s) or statistics associated with such objects. Such statistics may include a mean, mode, and/or median of the areas of the objects, a histogram or distribution of the areas, perimeters, and/or dimensions of the objects, bounding boxes of such objects, and the like. It should be apparent that other types of metrics apparent to one who has ordinary skill in the art may be developed by the measurement calculator 115. The measurement calculator 115, also at step 324, may display via the graphical user interface the metrics developed thereby or store such metrics in a data location (not shown) identified in the parameters specified at step 256 (FIG. 4). In some cases, the measurement calculator 115 may develop an image that represents the metrics developed thereby. Such image may include, for example, bounding boxes overlaid around the objects represented in the image(s) from which the metrics are developed, color coding objects in such objects in accordance with metrics associated with such objects (e.g., color coding objects within one standard deviation from the mean with a first color, within two standard deviations with a second color, and the like). It should be apparent to one who has ordinary skill in the art that the measurement calculator 115 may apply boundary or edge detection, boundary filling, and similar algorithms to the image(s) being measured to develop such metrics. Thereafter, the sequencer 106 returns to step 262, FIG. 4.

If, at step 320, the sequencer 106 determines that the image analysis step specified at step 256 (FIG. 4) does not specify developing metrics, the sequencer 106, at step 326, determines if the image analysis step specifies manually editing an image identified by a parameter associated with the specified image analysis step. If so, the sequencer 106, at step 328, loads the image to be edited and, at step 330, invokes the image editor 108 to allow the operator to manually edit the image, as described in greater detail below. Thereafter, the sequencer 106 proceeds to steps 306 and 308 to receive and store the results, respectively, generated by the image editor 108.

The operator may wish to edit an image, for example, that resulted from a previous image processing operation and that is displayed on the user computer 122. For example, if a segmented image generated by undertaking one or more image processing operation(s) incorrectly associates certain pixels thereof with an object, the operator may set a value of each such incorrectly associated pixel to a value associated with background (i.e., non-object) pixels. Such editing may be undertaken, for example, to edit the annotated training data before using such annotated training data to train the machine learning system 112.

If, at step 326, the sequencer 106 determines that the image analysis step does not specify manually editing an image, the sequencer 106 determines at step 332 if the image analysis step specifies training the machine learning system 112. If so, the sequencer 106, at step 334, invokes the machine learning system trainer 114 to train the machine learning system 112 as described below. Thereafter, processing proceeds to step 262 of FIG. 4.

If, at step 332, the sequencer 106 determines that the image processing operation specified by the operator does not specifying training the machine learning system 112, the image analysis system proceeds to step 256 (FIG. 4) to wait for a specification of another image analysis step. One of skill in the art would understand that the image analysis system 100 may receive additional input from the user computer 122 that are not relevant to the embodiments described herein. Such additional input is not described herein for sake of clarity.

Figure 6:
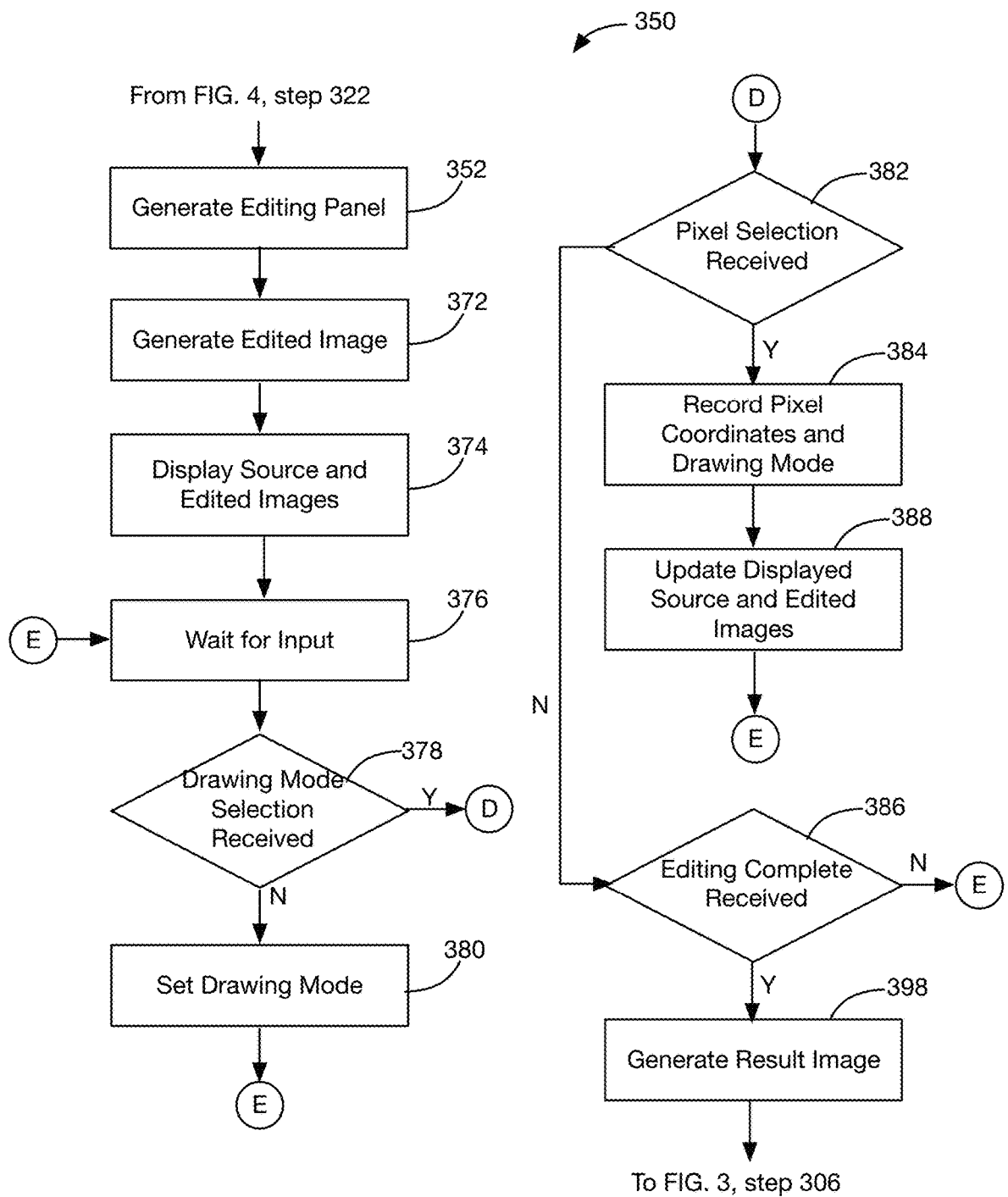
FIG. 6 is a flowchart of operation of an image editor of the image analysis system of FIG. 1.

FIG. 6 shows a flowchart 350 of the processing undertaken by the image editor 108, at step 330 of the flowchart 300 of FIG. 5, when the operator selects the image editing step. Referring to FIGS. 1, and 4-7A, at step 352 (FIG. 6), the image editor 108 directs the user interface generator 102 to generate the image editing panel 210f shown in FIG. 7. In particular, the image editing panel 210f of the GUI 200 enables the operator to edit an image generated by a previous image analysis step. The operator may edit a segmented or characterization image, for example, to adjust pixels associated with edges of an object to make such edges more apparent, to connect pixels of adjacent objects so that such pixels are associated into a single larger object, remove erroneously identified objects, and the like. In addition to these adjustments, the operator may edit a classification image to modify the classification of an object.

The image editing panel 210f includes the pop-up menu 212f (described above) to select a source image to edit, a text box 354 in which the operator may enter an identifier associated with the edited image, and selectable buttons 356, 358, 360, 362, and 364 to select a drawing mode described below. The image editing panel 210f also includes a button 366 labeled, in some embodiments, "Apply."

Referring also to FIGS. 5 and 6, at step 372 (FIG. 6), the image editor 108, creates an edited image that is a duplicate of the image to edited (i.e., the source image) that was loaded by the sequencer 106 at step 328 (FIG. 5). At step 374, the image editor 108 directs the user interface generator 102 to display the source image in a sub-region 368 and the edited image in the sub-region 370 of the region 204 of the GUI 200.

At step 376, the image editor 108 waits to receive an input (via the user interface generator 102) that indicates selection by the operator of one of the buttons 356-364, a pixel of the sub-region 368 in which the source image is displayed, or the "Apply" button 366.

Figure 7:
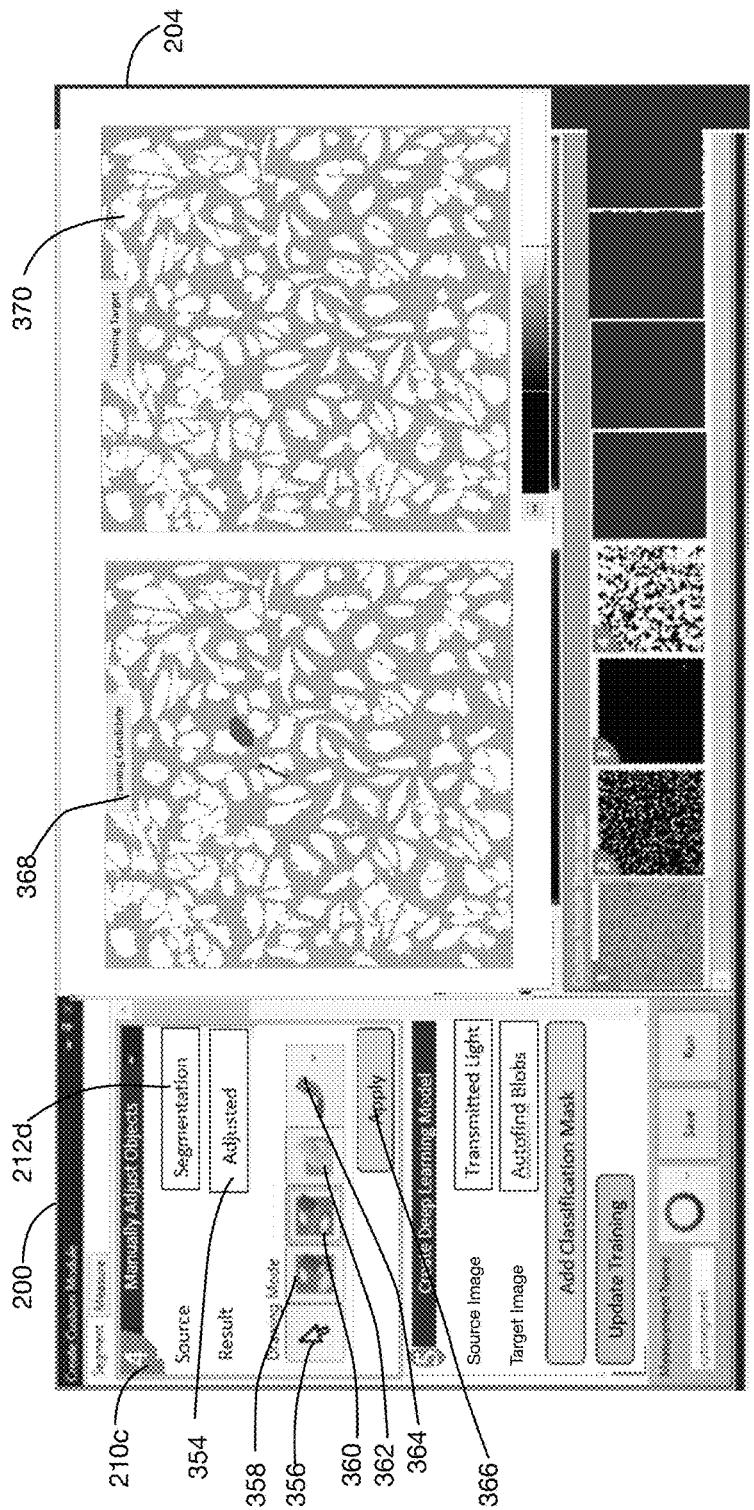
FIG. 7 is the graphical user interface of FIG. 3 when used to edit an image.

If at step 378, the image editor 108 determines if the input indicates selection of the one of the drawing mode buttons 356-364, and if so proceeds to step 380. Otherwise, the image editor 108 proceeds to step 382. At step 380, the image editor 108 sets a drawing mode that is in effect in accordance with the selected drawing mode button 356-364 (FIG. 7). In particular, if the button 358 is selected by the operator, a drawing mode is selected that sets a value of a pixel of the edited image that corresponds to each subsequently selected pixel of the source image to a first predetermined value associated with a foreground (e.g., to indicate that such pixel is associated with an object in the source image).

Similarly, if the button 360 is selected, a drawing mode that sets a value of a pixels of the edited image 370 that corresponds to each subsequently selected pixel of the source image displayed in the sub-region 368 to a second predetermined value associated with a background pixel (e.g., to indicate such pixel is not associated with an object in the source image).

The button 362 selects a drawing mode that sets a value of the edited image 370 that corresponds to subsequently selected to their unedited values (i.e., erases any edits performed on such selected pixels). The button 364 adjusts the number of pixels of the edited image 370 that are affected when a pixel of the source image displayed in the sub-region 368 is selected (i.e., adjusts the width of an editing cursor). Selecting the button 356 ends the drawing operation so that subsequently selecting a pixel of the source image displayed in the sub-region 368 does not affect any pixel of the edited image 370. The image editor 108 may provide additional drawing operation such as, for example, undo all edits, redo a previously undone edit, clear all edits, and the like.

The drawing mode set at step 380 remains in effect until the operator selects another different one of the buttons 356-364 or selects the "Apply" button 366. After setting the drawing mode, the image editor 108 returns to step 376 to wait to receive another input.

At step 382, if the image editor 108 determines that the input received at step 376 indicates selection of a pixel of the sub-region 368 (FIG. 7), the image editor 108 proceeds to step 384. Otherwise, the image editor 108 proceeds to step 386.

At step 384, the image editor 108 determines the coordinates of a pixel of the source image that correspond to the selected pixel of the sub-region 368 and records such coordinates and the drawing mode in effect in a memory (not shown) thereof. Thereafter, at step 388, the image editor 108 directs the user interface generator 102 to overlay the selected pixel of the sub-region 368 with a color associated with the drawing mode. Further, also at step 388, the image editor 108 directs the user interface generator 102 to overlay a pixel of the sub-region 370 with a color that corresponds to a foreground pixel or a color that corresponds to a background pixel in accordance with the drawing mode in effect.

Figure 7A:
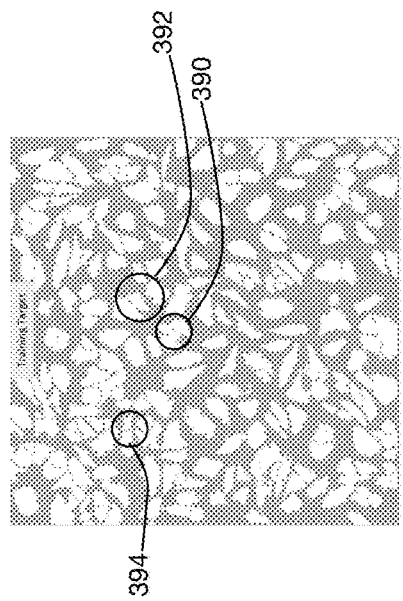
FIG. 7A shows an image before being edited that is depicted in the graphical user interface of FIG. 7.

For example, FIG. 7A shows an unedited version of the source image that is displayed in the sub-region 368. As shown in the edited image displayed in sub-region 370, portions of the unedited image indicated by circles 390 and 392 have been edited to change foreground pixels denoted in this example as white pixels to background pixels denoted in this example as gray pixels. The operator may make such an edit to set pixels of the edited image that were incorrectly identified in the source image as being associated with an object of interest. In addition, a portion of the unedited image indicated by the circle 394 has been edited to change foreground pixels within an object into background pixels, for example, to separate a single object in the source image into two objects in the edited image. Further, a portion of the source image indicated by the circle 396 has been edited to replace background pixels with foreground pixels to join two objects in the source image into a single object in the edited image.

Referring once again to FIG. 6, after the displayed source and edited images have been updated at step 388, the image editor 108 returns to step 376 to wait for another input from the operator.

If, at step 382, the image editor 108 determines that the operator did not select a pixel in the sub-region 368, then the image editor 108 determines at step 386 if the "Apply" button 366 was selected to indicate that image editing is complete. If so, at step 398, the image editor 108 generates a result image that is a duplicate of the source image. Thereafter, the image editor 108 modifies pixels of the result image in accordance with coordinate(s) and drawing mode(s) recorded at step 384. After generating the results image, processing proceeds to step 306 of FIG. 5.

If, at step 386, the image editor 108 determines that the operator did not select the "Apply" button 366, the image editor 108 returns to step 376 to wait for another input.

In some embodiments, the operator may select an image of a biological sample for editing as described above and displays the selected image in the region 368. Thereafter, the operator may specify certain pixels of the image displayed in the region 368 as foreground or associated with a particular classification value as described above. In response, the image editor 108 modifies the pixels of the region 368 in accordance with such specifications form the operator. When the operator selects the "Apply" button 366, the image editor 108 generates a result image having one result pixel for each pixel of image displayed in the region 368. The value of each such result pixel associated with an unmodified pixel displayed in the region 368 is set to a background value. The value of each result pixel that is associated with a modified pixel displayed in the region 368 is set to a value in accordance with the modification specified by the operator for such pixel.

Figure 8:
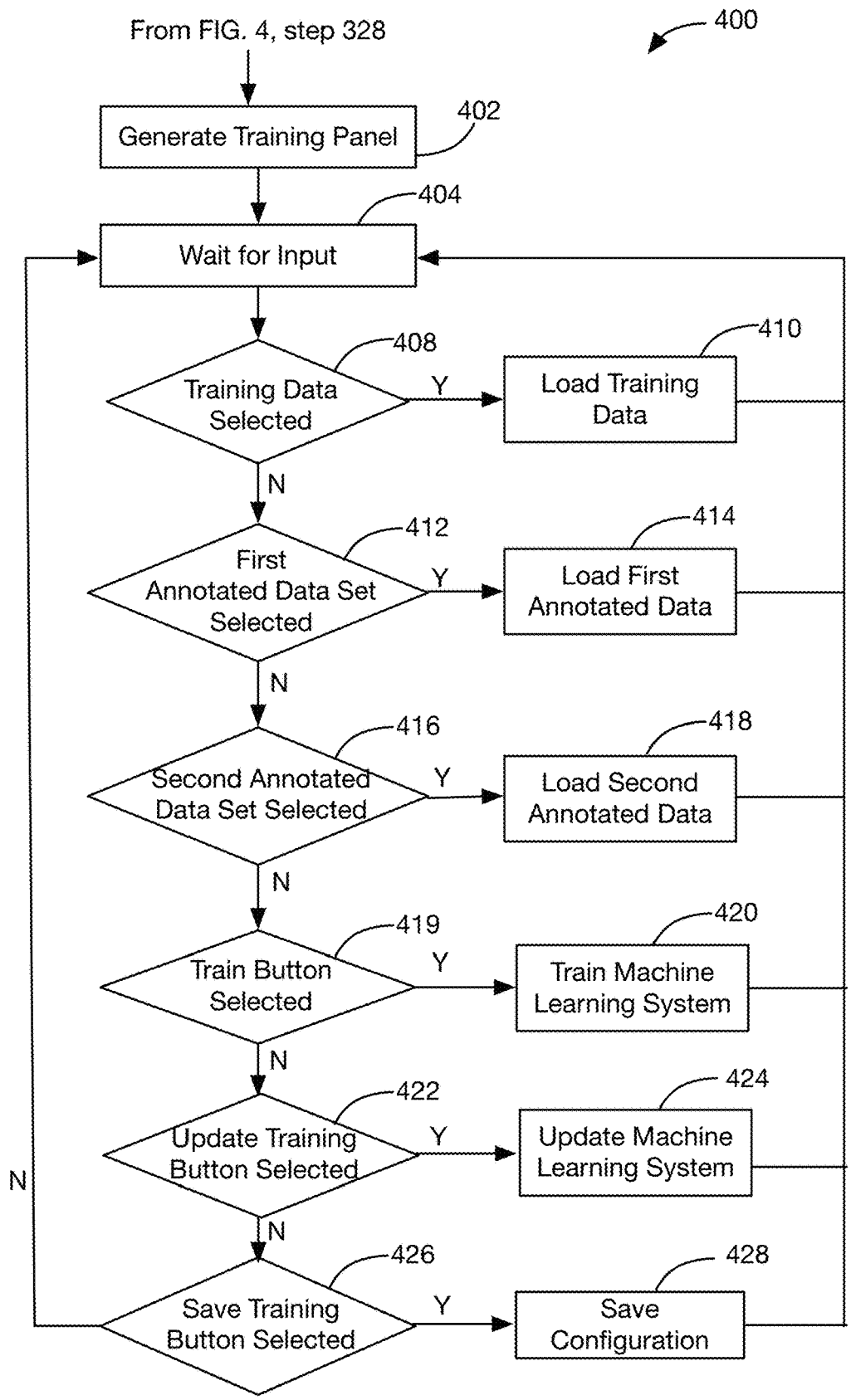
FIG. 8 is a flowchart that shows the operation of a machine learning system machine learning system trainer of the image analysis system of FIG. 1.
Figure 9:
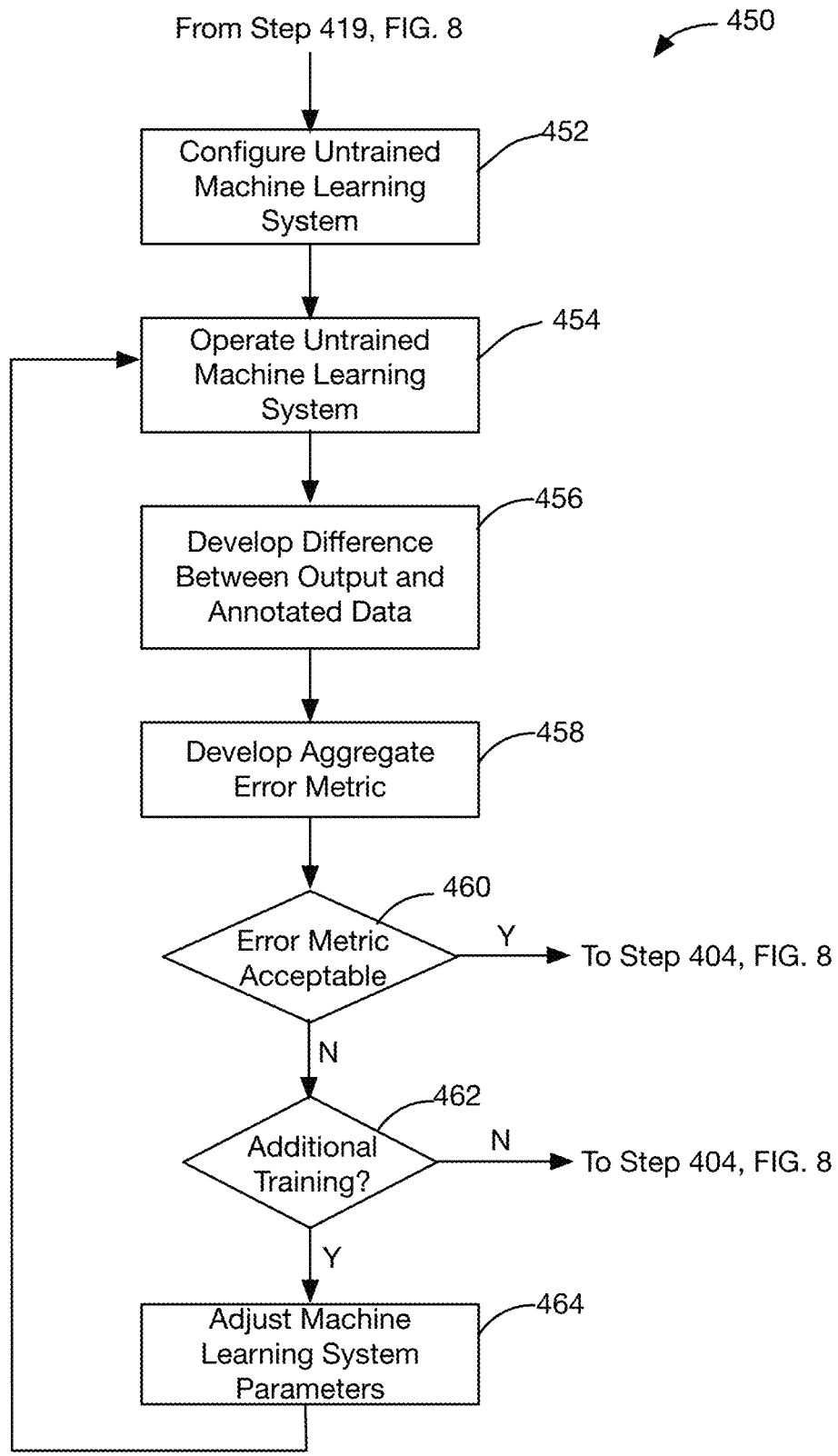
FIG. 9 is a flowchart that shows details of operation of the machine learning system machine learning system trainer of the image analysis system of FIG. 1.

FIG. 8 is a flowchart 400 of the steps undertaken when the sequencer 106 (FIG. 1) invokes the machine learning system trainer 114 (FIG. 1) to train the machine learning system 112 (FIG. 1) at step 334 (FIG. 4). Referring to FIGS. 1, 4, 8 and 9, at step 402, the machine learning system trainer 114 directs the user interface generator 102 to generate the machine learning system training panel 210*g* shown in FIG. 9. The machine learning system training panel 210*g* shown in FIG. 9 is substantially identical to the panel 210*g* shown in FIG. 2A.

The machine learning system training panel 210*g* includes a pop-up menu 212*g* that the operator may use to select a training image and a pop-up menu 212*h* to select first annotated training data that may be, for example, a segmented image that corresponds the training image. As described above, the training image and the segmented image may be developed from the same or different image sources. For example, the training image may be a transmitted light image of the biological sample and the segmented image may be developed by applying one or more image analysis steps to such transmitted light image of the biological sample. Alternately, the segmented image may be developed by applying one or more image analysis steps to another transmitted light image different than the training image of the biological sample, wherein the further transmitted light image is captured using a different combination of illuminant, lens(es), filter(s), and the like than that used to capture the training image. In some cases, the segmented image may be developed applying one or more image analysis steps to an image of the biological sample captured when the biological sample is undergoing fluorescence (i.e., a fluorescent image of the biological sample).

If the first annotated training data set is a segmented image, then as described above, the segmented image includes a pixel that corresponds to each pixel of the training image, and a value of each pixel of the segmented image indicates whether the corresponding pixel of the training image is associated with an object (i.e., is a foreground pixel) or is not associated with an object (i.e., is a background pixel).

In addition, the machine learning system training panel 210*g* includes a button 430 to allow the operator to specify an optional second annotated data set. The second annotated data set may be, for example, a classification image. In some embodiments, the second annotated data set may identify features of the object identified in the first annotated data set. For example, if the first annotated data set identifies cells, the second annotated data set may identify particular organelles within the cells. Similarly, the first annotated data set may identify one or more organoid(s) and the second annotated data set may identify one or more cell(s) of such organoid(s).

The machine learning system training panel 210*g* also includes a "Train" button 432 to initiate training of the machine learning system 112, an "Update Training" button 434 to update training of the machine learning system 112 with additional data, and a "Save Training" button 436 to save parameters associated with the trained machine learning system 112.

Referring once again to FIG. 8, after generating the machine learning system training panel 210*g*, at step 404, the machine learning system trainer 114 waits for an input from the operator via the user interface generator 102. At step 408, the machine learning system trainer 114 determines if the input indicates selection of training image. If so, at step 410, the machine learning system trainer 114 loads the training image and returns to step 404 to wait for an additional input.

Otherwise, at step 412, the machine learning system trainer 114 determines if the input indicates selection of a source of first annotated data and, if so, at step 414 loads the first annotated data and returns to step 404 to wait for additional input.

In some embodiments, the "Train" button 432 is not selectable when the machine learning system training panel 210g is initially generated by the user interface generator 102. In such embodiments, the machine learning system trainer 114 directs the user interface generator 102 to allow selection of the "Train" button 432 after a source of the first annotated training data has been selected, also at step 410.

Otherwise, at step 416, the machine learning system trainer 114 determines if the input indicates selection of a source of second annotated data and, if so, at step 418 loads the second annotated data set at step 418 and returns to step 404 to wait for additional input.

If at step 416, the input does not indicate selection of the second data set, the machine learning system trainer 114, at step 419, determines if the input indicates that the "Train" button 432 was selected. If so, the machine learning system trainer 114 proceeds to step 420, otherwise the machine learning system trainer 114 proceeds to step 422. At step 420, the machine learning system trainer 114 uses the training image loaded at step 410, the first annotated data loaded at step 414, and, if specified, the second annotated data selected and loaded at step 414 to train the machine learning system 112, as described in greater detail below. After training the machine learning system 112 is complete, the machine learning system trainer returns to step 404 to wait for additional input.

At step 422, the machine learning system trainer 114 determines if the "Update Training" button 434 was selected and, if so, proceeds to step 424 to update the training of a previously trained machine learning system 112 as described in greater detail below. Otherwise the machine learning system trainer 114 proceeds to step 426.

In some embodiments, the "Save Training" button 436 is not selectable when the machine learning system training panel 210 is initially generated by the user interface generator 102. In such embodiments, the machine learning system trainer 114 directs the user interface generator 102 to allow selection of the "Save Training" button 436 after the machine learning system 112 has been trained or the training of the machine learning system 112 has been updated, at steps 420 and 424, respectively.

At step 426, the machine learning system trainer 114 determines if the input indicates selection of the "Save Training" button 436. If so, the machine learning system trainer 114 proceeds to step 428, otherwise the machine learning system trainer proceeds to step 404 to wait for additional input.

At step 428, the machine learning system trainer 114 directs the user interface generator 102 to request an identifier to associate with the trained machine learning system 112. If a previously trained machine learning system 112 has been retrained just prior to selecting the "Save Training" button 436, then the machine learning system trainer may allow the operator to specify the identifier associated with such previously trained machine learning system 112 or a different identifier.

Thereafter, the machine learning system trainer 114 stores in the machine learning parameters data store 120, the parameters associated with each node of the machine learning system 112. Such parameters include, for example, activation thresholds, input and output scaling factors or weights, convolution kernels, and the architecture of machine learning system 112. For example, if the machine learning system 112 is a neural network, the architecture of the nodes or neurons in each layer, interconnections between node layers, and the like are stored in the machine learning parameters data store 120. As would be understood by one who has ordinary skill in the art, such neural network parameter may include interconnections of one or more convolution layers and one or more neuron layers with one or more pooling layers therebetween. The parameters that are stored are sufficient to configure an untrained machine learning system 112 to a trained state.

The stored parameters are associated with the identifier of the trained machine learning system provided by the operator, so that such parameters may be retrieved from the machine learning parameters data store by using such identifier. In some embodiments, the identifier of the trained machine learning system is used as a name of a file or a directory in the machine learning parameters data store 120 in which the parameters are stored. In other embodiments, the parameters are stored in a relational or other type of database and the identifier of the trained machine learning system is an index value that may be used to query the database for such parameters. It should be apparent to one who has ordinary skill in the art that other ways of associating the identifier of and the parameters associated with the trained machine learning system may be used.

Further, at step 420, the machine learning system trainer 114 adds an icon 208 having the identifier of the trained machine learning to the region 206 (or a menu associated with an already existing icon 208) of the GUI 200 as an image processing operation so that the trained machine learning system may be specified in an image analysis step, for example at step 318, in future workflows developed using the image analysis system 100.

FIG. 9 is a flowchart 450 of the processing undertaken at step 420 of the flowchart 400 shown in FIG. 8. Referring to FIG. 9, at step 452, the machine learning system trainer 114 configures an architecture for an untrained machine learning system 112. Such configuration specifies the number of inputs and output of such machine learning system 112. For example, the number of inputs may be specified in accordance with the number of pixels in the training image loaded at step 410, and the number of outputs may be specified in accordance with a sum of the number of values in the first and second annotated data sets.

In addition, if the machine learning system 112 is a neural network, the configuration may specify a number of layers in the neural network, the number of such layers that are convolutional layers, pooling layers, and/or neuron layers. Further, the configuration may specify the interconnections between the layers that comprise the machine learning system 112.

In some embodiments, if the machine learning system 112 comprises a neural network, such neural network is configured using AutoML and NASNet technologies developed by Google Inc. of Mountain View, Calif. It should be apparent that other neural network technologies known to those who have skill in the art may be used including, for example, a fully convolutional DenseNet, neural networks optimized for machine vision applications, and the like. It should be apparent that the machine learning system 112 may be another type of machine learning system including a random forest tree and the like.

In some embodiments, the architecture of the untrained machine learning system 112 is selected from one or more predetermined configurations. The factors that may be considered to select such configuration may include, for example, a size (e.g., number of pixels, image dimensions, etc.) of the training data, a size of the annotated data set(s), a speed with which to train the machine learning system 112, an acceptable accuracy level of the results generated by the machine learning system 112, the memory and processing requirements of the machine learning system 112, type of output that is to be produced (e.g., if the machine learning system will produce a segmented image, data that identifies one or more centroid(s) of objects in the input image, an image that classifies objects in the input image, etc.), the complexity of the data provided as an input to the machine learning system 112, the sizes and/or complexity of the objects represented in the image analyzed by the machine learning system 112, and the like. Some configuration may be optimized for particular types of samples (e.g., neurites, TL cell monolayers, etc.) represented in the image to be analyzed by the machine learning system 112. Different configurations may be used to analyze a two-dimensional image of a biological sample versus a series of two-dimensional images that capture a three-dimensional view of a biological sample.

At step 454, the machine learning system trainer 114 presents the training image loaded at step 410 as an input to the machine learning system 112 configured at step 452, and in response the machine learning system 112 develops first predicted output values that correspond to the first annotated training data. Each one of the first predicted output values corresponds to one of the first annotated training data. If the training image is an image of a biological sample, and the first annotated training data represents a segmented image developed from a first source image, wherein the first source image is the training image or another image of biological sample captured under different imaging conditions, each first predicted output value indicates the probability that a corresponding pixel of the first source image is associated with an object of interest in the training image (i.e., is a foreground pixel), as specified by the segmented image.

Further, if second annotated training data were loaded at step 414, then, in some embodiments, the machine learning system 112 simultaneously develops second predicted output values, each such value corresponding to a pixel of the second annotated training data. For example, if the second annotated training data were developed from a second source image that is either the training image or another image of the biological sample, and such annotated training data identifies pixels in the second source image that are associated with particular characteristics (for example, using intensity coding to identify different characteristics), each second predicted output value indicates a probability that a corresponding pixel of the training image is associated with one such particular characteristics.

At step 456 the machine learning system trainer 114 develops a first difference between the first set of output values and the first annotated training data. If the second set of annotated training data were loaded, the machine learning system trainer 114 also develops a second difference between the second set of output values and the second annotated training data. In some embodiments, such difference(s) is/are calculated using a loss function such as, for example, a weighted categorical cross entropy function.

At step 458, the machine learning system trainer 114 combines the first and any second difference(s) to develop an aggregate error metric. Such error metric may be, for example, the number of pixels of the training image that were correctly associated with the segmentation and characteristics as represented in the first annotated training data and second annotated training data, respectively. At step 460, the machine learning system trainer 114 determines if the magnitude of aggregate error metric is less than a predetermined acceptable error, and if so processing proceeds to step 404 of the flowchart 400 shown in FIG. 8.

Otherwise, at step 462, the machine learning system trainer 114 determines if additional training of the machine learning system 112 should be undertaken in accordance with, for example, the number of iterations of training that have been undertaken, a rate of improvement in the aggregate the aggregate error metric between success training passes, an amount of time undertaken for training, and other such conditions apparent to one who has ordinary skill in the art. If additional training is warranted, the machine learning system trainer 114 proceeds to step 464, otherwise processing returns to step 404 of the flowchart 400 shown in FIG. 8.

At step 464, the machine learning system trainer 114 uses the difference values developed at step 456 to adjust the parameters of the machine learning system 112, for example, using backpropagation or another technique, as would be understood by one who has ordinary skill in the art.

After adjusting the parameters, the machine learning system trainer 114 returns to step 454 to operate the machine learning system 112 using the adjusted parameters.

In some cases, the machine learning system trainer 114, at step 462, may determine that the aggregate error metric is greater the predetermined acceptable error but that additional training is not warranted (e.g., if the aggregate error metric is not improving). In such cases, the machine learning system trainer 114 may direct the user interface generator 102 to display the aggregate error metric on the user computer 122 with a message that such aggregate error metric is greater than the predetermined acceptable error and not undertake additional training.

In some embodiments, the machine learning system 112 may be trained to operate on subsections (or tiles) of the training image instead of using all of the pixels of the training image simultaneously. In such embodiments, the number of inputs configured at step 452 may be in accordance with the number of pixels of each tile. Further, the machine learning system 112 may include functionality to divide the training image into such tiles. For example, the training image may be divided into tiles that have dimensions of, for example, 32 pixels by 32 pixels, wherein each tile duplicates some pixels, e.g. 8 pixels in each direction, of adjacent tiles. One of skill in the art would understand that tiles of other dimensions and having different amounts of duplicate pixels may be used. In other embodiments, the dimensions of the tiles may be selected in accordance with the expected number of pixels a cell or another portion of interest of the biological sample is expected to occupy.

When the machine learning system 112 is configured to operate on tiles developed from the training image, in some embodiments, the machine learning system 112 may be configured to generate one output value per tile that indicates a probability that such tile includes one or more pixels that represent a particular object of interest or characteristic of a biological sample. In other embodiments, the machine learning system 112 may be configured to generate output data that includes one value for each pixel of a tile. Further, in some embodiments, the machine learning system 112 may be configured with additional functionality that combines output data associated with tiles into an aggregate data that is associated with the training image from which such tiles were developed.

Figure 8A:
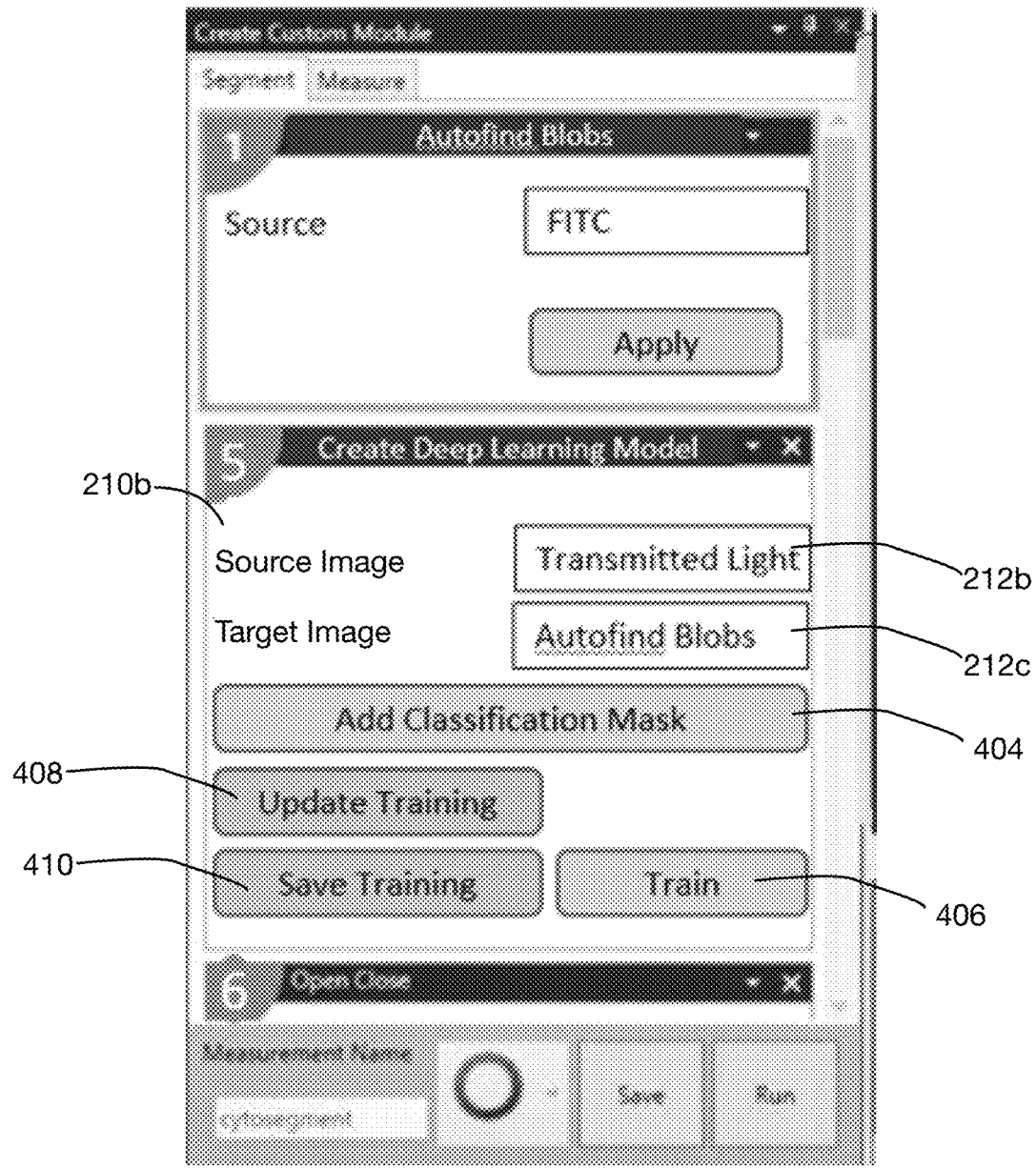
FIG. 8A is a panel of the graphical user interface shown in FIG. 3 used to operate a machine learning system machine learning system trainer of the image analysis system of FIG. 1.
Figure 10:
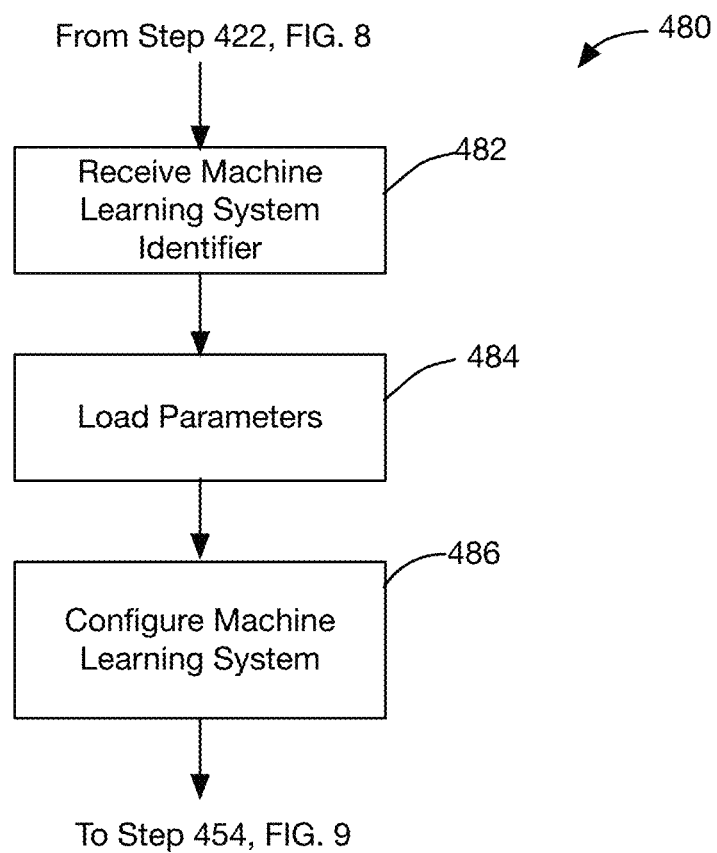
FIG. 10 is a flowchart that shows details of operation of using the machine learning system machine learning system trainer of the image analysis system of FIG. 1 to retrain the machine learning system.

FIG. 10 is a flowchart 480 of the processing undertaken at step 420 of the flowchart 400 shown in FIG. 8 to update the training of a previously trained machine learning system 112. An operator may wish to have the training of the machine training system 112 updated, if for example, the operator encounters an image that the previously trained machine learning system 112 does not adequately analyze an image (i.e., produces errant output values). As would be understood by one who has ordinary skill in the art, instead of starting with an untrained machine learning system 112, the machine learning system trainer 114 may use transfer learning or similar techniques to update the parameters of an already trained machine learning system 112. Referring to FIG. 8A, to initiate such retraining, the operator selects a new training image to use to update training of the machine learning system 112 using the parameter box 212g, an annotated data set using the parameter box 212h, and optionally a further annotated data set using button "Add Classification Mask" 430, as described above. The operator then selects the "Update Training" button 434.

Referring to FIG. 10, in one embodiment, the machine learning system trainer 114 directs the user interface generator 102 to obtain from the operator the identifier associated with the machine learning system to be retrained at step 482. In some embodiments, the user interface generator 102 presents a list of identifiers associated with machine learning parameters stored in the machine learning system data store 120, receives a selection of one of the presented identifiers, and provides such selection to the machine learning system trainer 114.

Thereafter, at step 484, the machine learning system trainer 114 loads from the machine learning data store 120 the parameters associated with selected identifier. At step 486, the machine learning system trainer 114 configures an untrained machine learning system 112 using the loaded parameters. Thereafter, the machine learning system trainer 114 proceeds to step 454 (FIG. 9) to train the configured machine learning system 112 using the training image, the first annotated data set, and second annotated data set, if any, loaded at steps 410, 414, and 418, respectively, of FIG. 8.

Although, the image analysis system 100 described in the foregoing is described as being used to train the machine learning system 112 to analyze individual two-dimensional images, such image analysis system 100 may be adapted to train the machine learning system 112 to analyze a series of two-dimensional transmitted light images of a biological sample taken at different focal points that represent a three-dimensional representation of such biological sample. In such embodiments, the training image used to train the machine learning system 112 comprise a series of training images, wherein all images comprising such series are associated with a substantially identical X-Y location of the biological sample and with a different focal point (i.e., different Z location). All of the images that comprise such series of images series are simultaneously provided to the machine learning system 112 and the machine learning system 112 generates predicted values, wherein each value is associated with a pixel of the series of images and indicates a probability that such pixel is associated with an object of interest (in 3-dimensions) or is associated with a particular characteristic.

In some embodiments, the annotated data developed from the series of training images obtained at different Z locations represents a confocal image developed from such series. Thereafter, the series of training images and the annotated data set may be used to train the machine learning system 112 to generate a confocal image from a series of images taken at different focal points.

Referring once again to FIG. 2, as would be apparent to one who has ordinary skill in the art, the image(s) of biological samples selected as training data at step 160 may be a binary image, a grayscale image, or an image having multiple color planes. Similarly, the first and/or second annotated data developed at steps 154 and 156, respectively, may comprise binary values (e.g., single bit), gray scale or single byte values, multi-color or multi-byte values, and/or a combination thereof. Further, the data generated by the trained machine learning system may comprise binary values (e.g., single bit), gray scale or single byte values, multi-color or multi-byte values, and/or a combination thereof.

It should be apparent to those who have skill in the art that any combination of hardware and/or software may be used to implement the image analysis system 100 described herein. It will be understood and appreciated that one or more of the processes, sub-processes, and process steps described in connection with FIGS. 1-10 may be performed by hardware, software, or a combination of hardware and software on one or more electronic or digitally-controlled devices. The software may reside in a software memory (not shown) in a suitable electronic processing component or system such as, for example, one or more of the functional systems, controllers, devices, components, modules, or sub-modules schematically depicted in FIGS. 1-10. The software memory may include an ordered listing of executable instructions for implementing logical functions (that is, "logic" that may be implemented in digital form such as digital circuitry or source code, or in analog form such as analog source such as an analog electrical, sound, or video signal). The instructions may be executed within a processing module or controller (e.g., the user interface generator 102, the image acquirer 104, the sequencer 106, the image editor 108, the image processor 110, the machine learning system trainer 114, and the machine learning system 112 of FIG. 2), which includes, for example, one or more microprocessors, general purpose processors, combinations of processors, digital signal processors (DSPs), field programmable gate arrays (FPGAs), or application-specific integrated circuits (ASICs). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

It should be apparent to one who has skill in the art that one or more components of the image analysis system 100 may operate in a cloud environment, for example, using distributed computing and storage systems connected over a local or wide area network (e.g., the Internet or a private network). For example, one or more of the user interface generator 102, the image acquirer 104, the sequencer 106, the image editor 108, the image processor 110, the machine learning system 112, and the machine learning system trainer 114 may operate on one or more computer(s) remote from the user computer 122, the imaging system 124, and/or one another. In one such configuration, for example, the image acquirer 104 may communicate with the imaging system 124 over the local or wide area network to acquire images from the imaging system 124 and store images acquired in this manner in a cloud-based images data store 116. The sequencer 106 may provide images stored in such cloud-based or remote images data store 116 to other components of the image analysis system 100 for processing in connection with undertaking one or more image analysis steps. The user may specify a path or paths(s) to one or more images stored in such images data store 116 in the panels 210. The machine learning system trainer 114 operating locally or in the cloud may access such images to train the machine learning system 112 and store the parameters in the machine learning system data store 120, which may be also be a cloud-based storage system. The sequencer 106 may access the parameters stored in the machine learning system parameters data store 120 to train an untrained machine learning system 112 (operating on a local computer or in the cloud environment). Similarly, operation of the machine learning system 112 may be undertaken to analyze images acquired using a local or remote imaging system 124.

The executable instructions may be implemented as a computer program product having instructions stored therein which, when executed by a processing module of an electronic system, direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access, i.e., volatile, memory (electronic); a read-only memory (electronic); an erasable programmable read only memory such as, for example, Flash memory (electronic); a compact disc memory such as, for example, CD-ROM, CD-R, CD-RW (optical); and digital versatile disc memory, i.e., DVD (optical).

It will also be understood that receiving and transmitting of signals or data as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only and should not be taken as limiting the scope of the disclosure.

We claim:

1. A system for analyzing images, wherein the system includes a programmable device, comprising:
   a sequencer operating on the programmable device that applies a first image analysis step to a first image to develop annotated training data, wherein specifications of the first image analysis step and the first image are developed using a graphical user interface operating on a computer; and
   a machine learning system trainer operating on the programmable device that trains an untrained machine learning system to develop a trained machine learning system, wherein when the trained machine learning system is presented with the first image as an input, the trained machine learning system develops a prediction of the annotated training data;
   wherein the sequencer analyzes a second image by undertaking a workflow, wherein the workflow is received from the computer and is specified using the graphical user interface and comprises a second image analysis step that that specifies operating the trained machine learning system.

2. The system of claim 1, wherein a user interface generator operating on the programmable device instructs the computer to generate the graphical user interface.

3. The system of claim 1, wherein the annotated training data comprises first annotated training data and the sequencer applies a third image analysis step to a third image to develop second annotated training data, and the machine learning system trainer trains the untrained machine learning system in accordance with the first and the second annotated training data to develop the trained machine system such that when the trained machine learning system is presented with the first image as an input, the trained machine learning system simultaneously develops predictions of the first and the second annotated data.

4. The system of claim 3, each of the plurality of second annotated training data values corresponds to a pixel of the third image, and the third image analysis step causes the sequencer to identify a group of adjacent pixels in the third image that have an identical value and to set the second annotated training data values associated with the pixels that comprise the group to a predetermined value.

5. The system of claim 4, wherein the second annotated training data and the third image are identical.

6. The system of claim 1, further comprising an image editor operating on the programmable device, wherein the sequencer develops an intermediate image from the first image by applying the first image analysis step and the image editor applies image editing instruction received from the computer to the intermediate image to develop the annotated training data.

7. The system of claim 6, wherein the intermediate image comprises a plurality of pixels, each of which corresponds to a pixel of the first image and has a value associated with an object or a value associated with a background.

8. The system of claim 7, wherein the image editing instruction causes the image editor to modify a value of one of the plurality of pixels from the value associated with the object to the value associated with the background.

9. The system of claim 1, wherein the programmable device comprises a first programmable device, the sequencer comprises a first sequencer, the machine learning system trainer comprises a first machine learning system trainer, the trained machine learning system comprises a first trained machine learning system, and the workflow comprises a first workflow, further comprising a second sequencer and a second machine learning system trainer operating on a second programmable device remote from the first programmable device, wherein the second machine learning system trainer configures an untrained machine learning system using parameters associated with the first trained machine learning system to develop a second trained machine learning system, the second sequencer receives a specification of a second workflow that specifies operating the second trained machine learning system, and applies the second workflow to a third image to analyze a third image.

10. The system of claim 1, the sequencer develops second annotated data from a third image and the machine learning system trainer uses the third image and the second annotated training data to update training of the trained machine learning system.

11. A method for analyzing images, comprising the step of:
operating a programmable device to undertake the steps of:
developing annotated training data by applying a first image analysis step to a first image, wherein specifications of the first image and the first image analysis step are developed using a graphical user interface operating on a computer;
training an untrained machine learning system to develop a trained machine learning system, wherein when the trained machine learning system is presented with the first image as an input, the trained machine learning system develops a prediction of the annotated training data; and
undertaking a workflow on a second image to analyze the second image, wherein a specification of the workflow is developed using the graphical user interface operating and comprises a second image analysis step, wherein the second analysis step includes operating the trained machine learning system.

12. The method of claim 11, further including operating the programmable device to instruct the computer to generate the graphical user interface.

13. The method of claim 11, wherein the annotated training data comprises first annotated training data, further comprising applying a third image analysis step to a third image to develop second annotated training data, and training the untrained machine learning system to develop the trained machine learning system such that when the trained machine learning system is presented with the first image as an input, the trained machine learning system simultaneously develops predictions of the first and the second annotated training data.

14. The method of claim 13, wherein the second annotated training data comprises a plurality of second annotated training data values, each of the plurality of second annotated training data values corresponds to a pixel of the third image, and operating the programmable device to undertake the further step of identifying a group of adjacent pixels in the third image that have an identical predetermined value and setting the second annotated training values associated with the pixels that comprise the group to a predetermined value associated with the group.

15. The method of claim 13, wherein the second annotated training data and the third image are identical.

16. The method of claim 11, wherein operating the programmable device to undertake developing the annotated training data comprises developing an intermediate image from the first image by applying the first image analysis step, receiving an image editing instruction, and applying the image editing instruction to the intermediate image to develop the annotated training data.

17. The method of claim 16, wherein the intermediate image comprises a plurality of pixels, each of which corresponds to a pixel of the first image and has a value that is associated with an object or a value associated with a background.

18. The method of claim 17, wherein operating the programmable device to undertake the image editing instruction causes the programmable device to undertake modifying a value of one of the plurality of pixels from a value associated with an object to a value associated with a background.

19. The method of claim 11 wherein the programmable device comprises a first programmable device, the workflow comprises a first workflow, and the trained machine learning system comprises a first trained machine learning system, further comprising operating a second programmable device remote from the first programmable device to undertake the steps of configuring an untrained machine learning system using parameters associated with the first machine learning system to develop a second trained machine learning system, receiving a specification of a second workflow that specifies operating the second trained machine learning system, and applying the second workflow to a third image to analyze the third image.

20. The method of claim 11, further comprising operating the programmable device to undertake the further steps of receiving a specification of a third image, developing second annotated data from the third image, and using transfer learning to update the training of the trained machine learning system using the third image and the second annotated training data.

* * * * *